United States Patent
Huang et al.

(10) Patent No.: US 12,457,627 B2
(45) Date of Patent: Oct. 28, 2025

(54) MULTICAST FEEDBACK CONFIGURATION METHOD AND APPARATUS

(71) Applicant: Huawei Technologies Co., Ltd., Shenzhen (CN)

(72) Inventors: Haining Huang, Beijing (CN); Xingwei Zhang, Lund (SE); Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1035 days.

(21) Appl. No.: 17/514,643

(22) Filed: Oct. 29, 2021

(65) Prior Publication Data
US 2022/0053495 A1 Feb. 17, 2022

Related U.S. Application Data

(63) Continuation of application No. PCT/CN2020/088239, filed on Apr. 30, 2020.

(30) Foreign Application Priority Data

May 1, 2019 (CN) .......................... 201910364623.X

(51) Int. Cl.
| | |
|---|---|
| *H04W 72/52* | (2023.01) |
| *H04L 5/00* | (2006.01) |
| *H04W 72/0446* | (2023.01) |
| *H04W 72/20* | (2023.01) |

(52) U.S. Cl.
CPC ........... *H04W 72/52* (2023.01); *H04L 5/0053* (2013.01); *H04W 72/0446* (2013.01); *H04W 72/20* (2023.01)

(58) Field of Classification Search
None
See application file for complete search history.

(56) References Cited

U.S. PATENT DOCUMENTS

10,735,148 B2 * 8/2020 Sun .................. H04W 74/08
12,127,278 B2 * 10/2024 Karampatsis ......... H04L 12/185
(Continued)

FOREIGN PATENT DOCUMENTS

| CN | 103828281 A | 5/2014 |
|---|---|---|
| CN | 104620528 A | 5/2015 |
(Continued)

OTHER PUBLICATIONS

3rd Generation Partnership Project; Technical Specification Group Radio Access Network; NR; Multiplexing and channel coding (Release 15), 3GPP TS 38.212, Mar. 2019, 101 Pages, V15.5.0.
(Continued)

*Primary Examiner* — Mariela Vidal Carpio
(74) *Attorney, Agent, or Firm* — Slater Matsil, LLP

(57) ABSTRACT

This application relates to the field of communication technologies, especially to V2X, intelligent driving, intelligent and connected vehicles, and the like. The method includes: sending, by a first terminal, first information to a second terminal, where the first information includes information indicating a feedback manner of first data, the first data is a data packet sent by the first terminal to the second terminal, the feedback manner is a first feedback manner or a second feedback manner, the first feedback manner is that the second terminal feeds back, to the first terminal, only acknowledgement information indicating that the data packet fails to be received, and the second feedback manner is that the second terminal feeds back, to the first terminal, acknowledgement information indicating that the data packet is successfully received or fails to be received. The method is applied to a multicast transmission process.

20 Claims, 9 Drawing Sheets

(56) References Cited

U.S. PATENT DOCUMENTS

| | | | |
|---|---|---|---|
| 12,185,342 B2* | 12/2024 | Lee | H04W 72/51 |
| 12,200,674 B2* | 1/2025 | Hong | H04W 72/0446 |
| 12,206,503 B2* | 1/2025 | Park | H04W 4/40 |
| 12,207,359 B2* | 1/2025 | Yasukawa | H04L 1/1896 |
| 2018/0145796 A1 | 5/2018 | Liang et al. | |
| 2018/0287763 A1 | 10/2018 | Baghel et al. | |
| 2019/0253958 A1* | 8/2019 | Lee | H04W 48/16 |
| 2020/0099476 A1* | 3/2020 | Park | H04W 4/70 |
| 2020/0145867 A1* | 5/2020 | Tseng | H04L 1/0026 |
| 2020/0228247 A1* | 7/2020 | Guo | H04W 52/383 |
| 2020/0260231 A1* | 8/2020 | Ganesan | H04L 1/1825 |
| 2020/0344722 A1* | 10/2020 | He | H04W 4/46 |
| 2020/0351032 A1* | 11/2020 | Wu | H04L 1/1861 |
| 2020/0359375 A1* | 11/2020 | Hwang | H04L 5/0055 |
| 2021/0022139 A1* | 1/2021 | Shin | H04W 28/0289 |
| 2021/0050954 A1* | 2/2021 | Ryu | H04W 76/14 |
| 2021/0105661 A1* | 4/2021 | Baghel | H04W 4/70 |
| 2021/0266804 A1* | 8/2021 | Lee | H04W 72/1263 |
| 2021/0314796 A1* | 10/2021 | Hoang | H04W 72/04 |
| 2022/0052792 A1* | 2/2022 | Lee | H04W 4/06 |
| 2022/0116974 A1* | 4/2022 | Hwang | H04L 1/00 |
| 2022/0173840 A1* | 6/2022 | Wang | H04L 1/1896 |
| 2022/0191862 A1* | 6/2022 | Hwang | H04W 72/0446 |
| 2022/0303952 A1* | 9/2022 | Hoang | H04L 5/0005 |
| 2022/0408481 A1* | 12/2022 | Lee | H04W 24/10 |
| 2023/0072122 A1* | 3/2023 | Zhao | H04W 72/20 |
| 2023/0292342 A1* | 9/2023 | Lee | H04W 72/566 |
| 2024/0357702 A1* | 10/2024 | Park | H04W 76/14 |

FOREIGN PATENT DOCUMENTS

| | | |
|---|---|---|
| CN | 104919745 A | 9/2015 |
| CN | 107483160 A | 12/2017 |
| CN | 108347313 A | 7/2018 |
| CN | 108631968 A | 10/2018 |
| CN | 109075921 A | 12/2018 |
| CN | 109792371 A | 5/2019 |
| JP | 2019024881 A | 2/2019 |
| JP | 2022533031 A | 7/2022 |
| WO | 2020222560 A1 | 11/2020 |
| WO | 2021166221 A1 | 8/2021 |

OTHER PUBLICATIONS

3rd Generation Partnership Project; Technical Specification Group Radio Access Network; NR; Physical layer procedures for control (Release 15), 3GPP TS 38.213, Mar. 2019, 104 Pages, V15.5.0.

3rd Generation Partnership Project; Technical Specification Group Radio Access Network; NR; Physical layer procedures for data (Release 15), 3GPP TS 38.214, Mar. 2019, 103 Pages, V15.5.0.

3rd Generation Partnership Project; Technical Specification Group Radio Access Network; NR; Medium Access Control (MAC) protocol specification (Release 15), 3GPP TS 38.321, Mar. 2019, 78 Pages, V15.5.0.

Mediatek Inc., "Discussion on physical layer procedure", 3GPP TSG RAN WG1 #96, R1-1901810, Feb. 25-Mar. 1, 2019, 9 Pages, Athens, Greece.

Sony, "Discussion on HARQ feedback for Nr V2X communication", 3GPP TSG RAN WG1 #96bis, R1-1904257, Apr. 8-Apr. 12, 2019, 3 Pages, Xi'an, China.

Qualcomm Incorporated, "Considerations on Physical Layer aspects of NR V2X", 3GPP TSG RAN WG1 Meeting #96bis, R1-1905008, Apr. 8-Apr. 12, 2019, 8 Pages, Xian, China.

Qualcomm Incorporated, "Physical layer procedures for sidelink", 3GPP TSG RAN WG1 Meeting #96bis, R1-1905012, Apr. 8-12, 2019, 14 Pages, Xian, China.

Nokia et al., "Discussion of physical layer structure for sidelink", 3GPP TSG RAN WG1 #96, R1-1905332, Apr. 8-Apr. 12, 2019, 15 Pages, Xi'an, China.

Nokia et al., "Discussions of physical layer procedures for sidelink", 3GPP TSG-RAN WG1 Meeting #97, R1-1906079, May 13-17, 2019, 9 Pages, Reno, USA.

Huawei et al., "Sidelink physical layer procedures for NR V2X", 3GPP TSG RAN WG1 Meeting #99, R1-1911887, Nov. 18-22, 2019, 30 Pages, Reno, USA.

LG Electronics Inc., "Discussion on groupcast HARQ in NR SL", 3GPP TSG-RAN WG2 Meeting #108, R2-1915516, Nov. 18-22, 2019, 5 Pages, Reno, USA.

3GPP TSG-RAN WG1 Meeting #96bis, R1-1905340, "Discussion on Sidelink groupcast HARQ", Nokia, Nokia Shanghai Bell, Xi'an, China, Apr. 8-12, 2019, total 9 pages.

Interdigital Inc., "Physical Layer Procedures for NR V2X Sidelink," 3GPP TSG RAN WGI Ad-Hoc Meeting 1901, R1-1900794, Taipei, Taiwan, Jan. 21-25, 2019, 10 pages.

Nokia et al., "Discussion of physical layer procedures for sidelink," 3GPP TSG-RAN WG1 Meeting #97, Reno, USA, R1-1906079, May 13-17, 2019, 9 pages.

Spreadtrum Communications, "Discussion on NR sidelink physical layer procedure, " 3GPP TSG RAN WG1 Ad-Hoc Meeting 1901, R1-1900714, Taipei, Jan. 21-25, 2019, 6 pages.

Xiaomi Communications, "On Physical layer procedures for V2x communications," 3GPP TSG RAN WG1 Ad-Hoc Meeting 1901, R1-1901017, Taipei, Jan. 21-25, 2019, 4 pages.

* cited by examiner

MULTICAST FEEDBACK CONFIGURATION METHOD AND APPARATUS

CROSS-REFERENCE TO RELATED APPLICATIONS

This application is a continuation of International Application No. PCT/CN2020/088239, filed on Apr. 30, 2020, which claims priority to Chinese Patent Application No. 201910364623.X, filed on May 1, 2019. The disclosures of the aforementioned applications are hereby incorporated by reference in their entireties.

TECHNICAL FIELD

This application relates to the field of communication technologies, especially to V2X, intelligent driving, intelligent and connected vehicles, and the like, and in particular, to a multicast feedback configuration method and apparatus.

BACKGROUND

In a wireless communication system, a hybrid automatic repeat request (HARQ) technology is usually used between a receive terminal and a transmit terminal to improve data transmission reliability. After a first terminal sends a data packet to a second terminal, the first terminal receives a HARQ feedback status from the second terminal, to learn of a data packet receiving status of the second terminal. The HARQ feedback status includes: a positive acknowledgement (ACK) state, a negative acknowledgement (NACK) state, and a discontinuous transmission (DTX) state in which neither an ACK nor a NACK is fed back. Specifically, if the second terminal successfully receives the data packet from the first terminal, the second terminal feeds back an ACK to the first terminal. If the second terminal fails to receive the data packet, the second terminal feeds back a NACK to the first terminal, so that the first terminal retransmits the data packet after receiving the NACK. If the second terminal loses the data packet sent by the first terminal, the second terminal is in the DTX state, that is, the second terminal neither feeds back the ACK nor feeds back the NACK. In this case, the first terminal also retransmits the data packet.

Currently, there are two feedback manners of new radio vehicle to everything (NR V2X) multicast. In addition, after the feedback manner is determined, the feedback manner remains unchanged. The feedback manner of the NR V2X multicast includes: The second terminal feeds back only a NACK, or the second terminal feeds back an ACK/a NACK.

For the feedback manner in which the second terminal feeds back only the NACK, each second terminal in the multicast feeds back only the NACK, and all the second terminals share one common feedback resource. The second terminal that fails to receive the data packet feeds back the NACK on the common feedback resource. An advantage of this feedback manner is that all the second terminals share one feedback resource, thereby avoiding a waste of resources. A disadvantage is that the first terminal cannot distinguish between the DTX feedback state and the ACK feedback state. To be specific, when the second terminal does not feed back the NACK, there may be two cases: The second terminal successfully receives the data packet. The second terminal loses control information transmitted through a physical sidelink control channel (PSCCH), and cannot receive the data packet. When the first terminal does not receive the feedback of the NACK, the first terminal considers that the feedback status is the ACK, and no longer retransmits the data packet. In this way, reliability of data transmission between the first terminal and the second terminal cannot be ensured.

For the feedback manner in which the second terminal feeds back the ACK/NACK, each second terminal has a resource dedicated for feeding back the ACK/NACK, that is, a resource for feeding back the ACK/NACK by a second terminal can be used only by the second terminal, and cannot be used by another second terminal. An advantage of this feedback manner is that the first terminal can recognize the DTX state. A disadvantage is that when there are a large quantity of second terminals in the multicast, the resource for feeding back the ACK/NACK needs to be configured for each second terminal, causing a waste of resources.

Therefore, the two feedback manners are applicable to different scenarios. However, in an NR V2X multicast process, a quantity of second terminals and a channel status continuously change. When the feedback manner to be used by the second terminal remains unchanged, system operating efficiency and resource utilization are reduced.

SUMMARY

Embodiments of this application provide a multicast feedback configuration method and apparatus, to ensure reliable data transmission and improve resource utilization.

To achieve the foregoing objective, the following technical solutions are used in the embodiments of this application.

According to a first aspect, this application provides a multicast feedback configuration method. The method may be performed by a first terminal. The first terminal apparatus may be a terminal device, or may be a component (for example, a chip system) in a terminal device. The method includes: sending, by the first terminal, first information to a second terminal, where the first information includes information indicating a feedback manner of first data, the first data is a data packet sent by the first terminal to the second terminal, the feedback manner is a first feedback manner or a second feedback manner, the first feedback manner is that the second terminal feeds back, to the first terminal, only acknowledgement information indicating that the data packet fails to be received, and the second feedback manner is that the second terminal feeds back, to the first terminal, acknowledgement information indicating that the data packet is successfully received or fails to be received.

According to the multicast feedback configuration method provided in this application, the first terminal sends the first information to the second terminal, where the first information includes the information indicating the feedback manner of the first data, the first data is the data packet sent by the first terminal to the second terminal, the feedback manner is the first feedback manner or the second feedback manner, the first feedback manner is that the second terminal feeds back, to the first terminal, only the acknowledgement information indicating that the data packet fails to be received, and the second feedback manner is that the second terminal feeds back, to the first terminal, the acknowledgement information indicating that the data packet is successfully received or fails to be received. In a current technology, a feedback manner to be used by a second terminal remains unchanged, and cannot be applicable to a channel status that changes in real time, resulting in low system operating efficiency and low resource utilization. In addition, when quantities of second terminals are different, sizes of resources required for different feedback manners are also different. If the feedback manner used by the second terminal remains unchanged, low resource utilization is also caused. According to the multicast feedback configuration method provided in this embodiment of this application, the first terminal can send the first information to the second terminal, to indicate the feedback manner of the first data. It can be learned that the first terminal can dynamically indicate the feedback manner to be used by the second terminal, and the feedback manner used by the second terminal no longer remains unchanged, so that the feedback manner is adapted to the dynamically changing channel status. For example, when a relatively large quantity of resources are occupied, the first terminal may indicate the second terminal to use the first feedback manner, to avoid a waste of resources. When a relatively small quantity of resources are occupied, the first terminal may indicate the second terminal to use the second feedback manner, to ensure data transmission reliability. Similarly, the first terminal can further consider resource overheads required by different quantities of second terminals, to dynamically adjust the feedback manner. For example, when there are a relatively large quantity of second terminals, the first terminal may indicate the second terminal to use the first feedback manner, to avoid a waste of resources. When there are a relatively small quantity of second terminals, the first terminal may indicate the second terminal to use the second feedback manner, to ensure the data transmission reliability.

In a possible design, the multicast feedback configuration method provided in this application further includes: obtaining, by the first terminal, second information, where the second information includes resource congestion control information and/or a quantity of second terminals, and the second information is used to determine the feedback manner. In this way, the first terminal can determine the feedback manner based on the second information, to ensure reliable data transmission and improve the resource utilization.

In a possible design, the second information includes the resource congestion control information, and the resource congestion control information includes a channel busy ratio CBR; and if the CBR is greater than a preset CBR critical value, the feedback manner is the first feedback manner; or if the CBR is less than or equal to a preset CBR critical value, the feedback manner is the second feedback manner.

In a possible design, the CBR is a first CBR, and the first CBR indicates a channel busy ratio of a physical sidelink feedback channel PSFCH, a physical sidelink shared channel PSSCH, and a physical sidelink control channel PSCCH in a preset measurement periodicity; or the CBR is a second CBR, and the second CBR indicates a channel busy ratio of a PSFCH in a preset measurement periodicity; or the CBR is determined based on a second CBR and a third CBR, the second CBR indicates a channel busy ratio of a PSFCH in a preset measurement periodicity, and the third CBR indicates a channel busy ratio of a PSSCH and a PSCCH in the preset measurement periodicity.

In a possible design, the second information includes the resource congestion control information, and the resource congestion control information includes a channel occupancy ratio CR; and if the CR is greater than a preset CR critical value, the feedback manner is the first feedback manner.

In a possible design, the second information includes the quantity of second terminals; and if the quantity of second terminals is greater than a preset quantity critical value, the feedback manner is the first feedback manner.

In a possible design, the second information includes the resource congestion control information and the quantity of second terminals, and the resource congestion control information includes a channel busy ratio CBR; and if the quantity of second terminals is in a first quantity interval, and the CBR is greater than a first CBR critical value, the feedback manner is the first feedback manner; or if the quantity of second terminals is in a first quantity interval, and the CBR is less than or equal to a first CBR critical value, the feedback manner is the second feedback manner, where there is at least one quantity interval of the second terminal, different quantity intervals correspond to different CBR critical values, and a CBR critical value corresponding to the first quantity interval is the first CBR critical value.

In a possible design, the multicast feedback configuration method provided in this application further includes: determining, by the first terminal, a quantity of retransmission times of the data packet, where the quantity of retransmission times of the data packet is a quantity of times that the first terminal retransmits the data packet in the first feedback manner; and determining, by the first terminal based on the quantity of retransmission times of the data packet, that the feedback manner is the second feedback manner.

In a possible design, the first information is sidelink control information SCI; and the SCI includes a preset field, the preset field is used to indicate the feedback manner to be used by the second terminal, and different values of the preset field indicate different feedback manners to be used by the second terminal; or the preset field includes a first preset field and a second preset field, where the first preset field is used to indicate a resource to be used by a PSFCH for transmitting the acknowledgement information in the first feedback manner; and the second preset field is used to indicate a resource to be used by the PSFCH for transmitting the acknowledgement information in the second feedback manner.

In a possible design, the first information is SCI; formats of the SCI include a first format and a second format; the SCI in the first format is used to indicate that the feedback manner to be used by the second terminal is the first feedback manner; and the SCI in the second format is used to indicate that the feedback manner to be used by the second terminal is the second feedback manner.

In a possible design, the first information is SCI; the SCI includes format information of a PSFCH, and the format information of the PSFCH includes a first format and a second format, the PSFCH in the first format is used to indicate that the feedback manner to be used by the second terminal is the first feedback manner; and the PSFCH in the second format is used to indicate that the feedback manner to be used by the second terminal is the second feedback manner.

In a possible design, according to the multicast feedback configuration method provided in this application, before the sending, by the first terminal, first information to a second terminal, the method further includes: receiving, by the first terminal, third information from an access network device, where the third information includes the information indicating the feedback manner of the first data.

In a possible design, the third information is system information, and a master information block MIB of the system information includes the information indicating the feedback manner to be used by the second terminal, or a system information block SIB of the system information includes the information indicating the feedback manner to be used by the second terminal; or the third information is radio resource control RRC signaling, and the RRC signaling includes the information indicating the feedback manner to be used by the second terminal; or the third information is medium access control MAC signaling, and the MAC signaling includes the information indicating the feedback manner to be used by the second terminal; or the third information is downlink control information DCI, and the DCI includes the information indicating the feedback manner to be used by the second terminal.

According to a second aspect, this application provides a multicast feedback configuration apparatus. The apparatus may be the first terminal in the first aspect. The apparatus includes a processor, a receiver, and a transmitter. Specifically, the transmitter is configured to send first information to a second terminal, where the first information includes information indicating a feedback manner of first data, the first data is a data packet sent by the first terminal to the second terminal, the feedback manner is a first feedback manner or a second feedback manner, the first feedback manner is that the second terminal feeds back, to the first terminal, only acknowledgement information indicating that the data packet fails to be received, and the second feedback manner is that the second terminal feeds back, to the first terminal, acknowledgement information indicating that the data packet is successfully received or fails to be received.

In a possible design, the receiver is configured to obtain second information, where the second information includes resource congestion control information and/or a quantity of second terminals, and the second information is used to determine the feedback manner.

In a possible design, the second information includes the resource congestion control information, and the resource congestion control information includes a channel busy ratio CBR; and if the CBR is greater than a preset CBR critical value, the feedback manner is the first feedback manner; or if the CBR is less than or equal to a preset CBR critical value, the feedback manner is the second feedback manner.

In a possible design, the CBR is a first CBR, and the first CBR indicates a channel busy ratio of a physical sidelink feedback channel PSFCH, a physical sidelink shared channel PSSCH, and a physical sidelink control channel PSCCH in a preset measurement periodicity; or the CBR is a second CBR, and the second CBR indicates a channel busy ratio of a PSFCH in a preset measurement periodicity; or the CBR is determined based on a second CBR and a third CBR, the second CBR indicates a channel busy ratio of a PSFCH in a preset measurement periodicity, and the third CBR indicates a channel busy ratio of a PSSCH and a PSCCH in the preset measurement periodicity.

In a possible design, the second information includes the resource congestion control information, and the resource congestion control information includes a channel occupancy ratio CR; and if the CR is greater than a preset CR critical value, the feedback manner is the first feedback manner.

In a possible design, the second information includes the quantity of second terminals; and if the quantity of second terminals is greater than a preset quantity critical value, the feedback manner is the first feedback manner.

In a possible design, the second information includes the resource congestion control information and the quantity of second terminals, and the resource congestion control information includes a channel busy ratio CBR; and if the quantity of second terminals is in a first quantity interval, and the CBR is greater than a first CBR critical value, the feedback manner is the first feedback manner; or if the quantity of second terminals is in a first quantity interval, and the CBR is less than or equal to a first CBR critical value, the feedback manner is the second feedback manner, where there is at least one quantity interval of the second terminal, different quantity intervals correspond to different CBR critical values, and a CBR critical value corresponding to the first quantity interval is the first CBR critical value.

In a possible design, the processor is configured to determine a quantity of retransmission times of the data packet, where the quantity of retransmission times of the data packet is a quantity of times that the first terminal retransmits the data packet in the first feedback manner; and the processor is further configured to determine, based on the quantity of retransmission times of the data packet, that the feedback manner is the second feedback manner.

In a possible design, the first information is sidelink control information SCI; and the SCI includes a preset field, the preset field is used to indicate the feedback manner to be used by the second terminal, and different values of the preset field indicate different feedback manners to be used by the second terminal; or the preset field includes a first preset field and a second preset field, where the first preset field is used to indicate a resource to be used by a PSFCH for transmitting the acknowledgement information in the first feedback manner; and the second preset field is used to indicate a resource to be used by the PSFCH for transmitting the acknowledgement information in the second feedback manner.

In a possible design, the first information is SCI; formats of the SCI include a first format and a second format; the SCI in the first format is used to indicate that the feedback manner to be used by the second terminal is the first feedback manner; and the SCI in the second format is used to indicate that the feedback manner to be used by the second terminal is the second feedback manner.

In a possible design, the first information is SCI; the SCI includes format information of a PSFCH, and the format information of the PSFCH includes a first format and a second format, the PSFCH in the first format is used to indicate that the feedback manner to be used by the second terminal is the first feedback manner; and the PSFCH in the second format is used to indicate that the feedback manner to be used by the second terminal is the second feedback manner.

In a possible design, the receiver is configured to: before the first information is sent to the second terminal, receive third information from an access network device, where the third information includes the information indicating the feedback manner of the first data.

In a possible design, the third information is system information, and a master information block MIB of the system information includes the information indicating the feedback manner to be used by the second terminal, or a system information block SIB of the system information includes the information indicating the feedback manner to be used by the second terminal; or the third information is radio resource control RRC signaling, and the RRC signaling includes the information indicating the feedback manner to be used by the second terminal; or the third information is medium access control MAC signaling, and the MAC signaling includes the information indicating the feedback manner to be used by the second terminal; or the third information is downlink control information DCI, and the DCI includes the information indicating the feedback manner to be used by the second terminal.

According to a third aspect, this application provides a multicast feedback configuration apparatus, configured to implement a function of the first terminal in the first aspect.

According to a fourth aspect, an embodiment of this application provides a multicast feedback configuration apparatus. The apparatus has a function of implementing the multicast feedback configuration method in any one of the first aspect or the possible designs of the first aspect. The function may be implemented by hardware, or may be implemented by hardware executing corresponding software. The hardware or the software includes one or more modules corresponding to the function.

According to a fifth aspect, a multicast feedback configuration apparatus is provided. The apparatus includes a processor and a memory. The memory is configured to store computer-executable instructions. When the multicast feedback configuration apparatus runs, the processor executes the computer-executable instructions stored in the memory, so that the multicast feedback configuration apparatus performs the multicast feedback configuration method according to any one of the first aspect or the possible designs of the first aspect.

According to a sixth aspect, a multicast feedback configuration apparatus is provided. The apparatus includes a processor. The processor is configured to: be coupled to a memory, read instructions in the memory, and perform, according to the instructions, the multicast feedback configuration method according to any one of the first aspect or the possible designs of the first aspect.

According to a seventh aspect, a computer-readable storage medium is provided. The computer-readable storage medium stores instructions. When the instructions are run on a computer, the computer is enabled to perform the multicast feedback configuration method according to any one of the first aspect or the possible designs of the first aspect.

According to an eighth aspect, a computer program product including instructions is provided. When the computer program product runs on a computer, the computer is enabled to perform the multicast feedback configuration method according to any one of the first aspect or the possible designs of the first aspect.

According to a ninth aspect, a circuit system is provided. The circuit system includes a processing circuit, and the processing circuit is configured to perform the multicast feedback configuration method according to any one of the first aspect or the possible designs of the first aspect.

According to a tenth aspect, this application provides a chip. The chip includes a processor. The processor is coupled to a memory. The memory stores program instructions. When the program instructions stored in the memory are executed by the processor, the multicast feedback configuration method according to any one of the first aspect or the possible designs of the first aspect is implemented.

According to an eleventh aspect, a communication system is provided. The communication system includes the first terminal apparatus in any one of the foregoing aspects and the second terminal apparatus in any one of the foregoing aspects.

For technical effects brought by any possible design of the second to the eleventh aspects, refer to technical effects brought by different design manners of the first aspect. Details are not described herein again.

DETAILED DESCRIPTION OF ILLUSTRATIVE EMBODIMENTS

Figure 1:
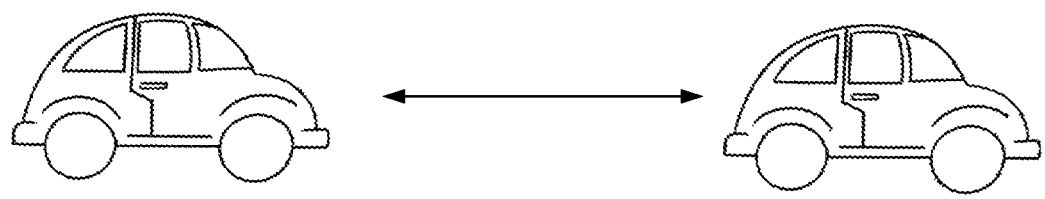
FIG. 1 is a schematic diagram of a communication system according to an embodiment of this application.

In the specification and accompanying drawings of this application, the terms "first", "second", and the like are intended to distinguish between different objects or distinguish between different processing of a same object, but do not indicate a particular sequence of the objects. In addition, the terms "including", "having", or any other variant thereof in descriptions of this application are intended to cover non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that, in the embodiments of this application, the word such as "example" or "for example" is used to represent giving an example, an illustration, or a description. Any embodiment or design scheme described as "example" or "for example" in the embodiments of this application should not be explained as being more preferred or having more advantages than another embodiment or design scheme. Exactly, use of the word such as "example" or "for example" is intended to present a relative concept in a specific manner.

First, technical terms in the embodiments of this application are described.

Channel busy ratio (CBR): indicates a ratio of a quantity of subchannels whose sidelink received signal strength indicators (S-RSSI) exceed a preconfigured critical value to a total quantity of subchannels in a preset measurement periodicity (for example, 100 ms). The CBR is an indicator for measuring an interference degree. A larger CBR indicates a higher channel busy degree, heavier system load, and stronger interference between different terminals. If an S-RSSI of a subchannel is greater than the preconfigured critical value, it indicates that the subchannel is occupied; and if an S-RSSI of a subchannel is less than or equal to the preconfigured critical value, it indicates that the subchannel is not occupied. CBRs obtained in different CBR measurement manners may represent different types of channel busy degrees. For example, within the preset measurement periodicity of 100 ms, if a first terminal performs CBR measurement on three channels, namely, a PSFCH, a PSSCH, and a PSCCH, an obtained CBR indicates an overall channel busy degree of the PSFCH, the PSSCH, and the PSCCH within the preset measurement periodicity; if the first terminal performs CBR measurement on a PSFCH channel, an obtained CBR indicates a busy degree of the PSFCH channel in the preset measurement periodicity; or if the first terminal performs CBR measurement on two channels, namely, a PSSCH and a PSCCH, an obtained CBR indicates an overall channel busy degree of the PSSCH and the PSCCH in the preset measurement periodicity. For a detailed procedure in which the first terminal performs CBR measurement on different channels to obtain CBRs, refer to a current technology. Details are not described herein.

Channel occupancy ratio (CR): indicates a ratio of a quantity of subchannels actually occupied by a terminal to a total quantity of subchannels in a preset measurement periodicity (for example, 1000 ms). The CR is an indicator for measuring a terminal feature. A larger CR indicates more resources occupied by a terminal.

A first feedback manner is that a second terminal feeds back, to the first terminal, only acknowledgement information indicating that a data packet fails to be received, that is, feeds back a negative acknowledgement only (NACK only). In a multicast scenario, when the first feedback manner is used, the first terminal sends a data packet to the second terminal, and all second terminals share a same feedback resource.

A second feedback manner is that the second terminal feeds back, to the first terminal, acknowledgement information indicating that a data packet is successfully received or fails to be received, that is, feeds back a positive acknowledgement/a negative acknowledgement (ACK/NACK). In a multicast scenario, when the second feedback manner is used, the first terminal sends a data packet to the second terminal, and each second terminal has its dedicated feedback resource.

Feedback resource: A time-frequency resource occupied for transmitting HARQ information in a hybrid automatic repeat request (HARQ) technology.

The embodiments of this application may be applied to a system for communication between terminals, for example, a V2X communication system or a device-to-device (D2D) system. Referring to FIG. 1, the communication system includes at least two terminals, and the two terminals can directly communicate with each other through a sidelink (SL). Optionally, referring to FIG. 2, the communication system further includes an access network device. The terminal may further communicate with the access network device (FIG. 1 and FIG. 2 show only two terminals).

The terminal is mainly configured to receive or send data. Optionally, the terminal in the embodiments of this application may be a device or a component in a device that implements a function of the terminal. For example, the terminal includes, for example, but is not limited to, various handheld devices, vehicle-mounted devices, wearable devices, or computing devices that have a wireless communication function, or other processing devices connected to a wireless modem. The terminal may further include a subscriber unit, a cellular phone, a smartphone, a wireless data card, a personal digital assistant (PDA) computer, a tablet computer, a handheld device, a laptop computer, a machine type communication (MTC) terminal, user equipment (UE), and a mobile terminal. For another example, the terminal may be a component in any one of the foregoing devices (for example, the terminal may be a chip system in any one of the foregoing devices). The terminal in the embodiments of this application may alternatively be an in-vehicle module, an in-vehicle module, an in-vehicle component, an in-vehicle chip, or an in-vehicle unit that is built in a vehicle as one or more components or units. The vehicle may implement the method in this application by using the in-vehicle module, the in-vehicle module, the in-vehicle component, the in-vehicle chip, or the in-vehicle unit that is built in the vehicle. In some embodiments of this application, the terminal may also be referred to as a terminal. A general description is provided herein, and details are not described below.

The access network device is an apparatus that is deployed in a radio access network and that is configured to provide a wireless communication function. Optionally, the access network device may be a device that communicates with a wireless terminal by using one or more cells through an air interface of an access network. An apparatus for implementing a function of the access network device may be an access network device, or may be an apparatus (for example, a chip in the access network device) that supports the access network device in implementing the function. Optionally, the access network device may perform attribute management on the air interface. A base station device may further coordinate attribute management on the air interface. The access network device includes a macro base station and a micro base station (which is also referred to as a small cell) in various forms, for example, a relay device of a relay station or a chip of a relay device, a transmission reception point (TRP), an evolved NodeB (eNB), a next-generation network node (g Node B, gNB), an evolved NodeB connected to a next-generation core network (ng evolved Node B, ng-eNB). Alternatively, in a distributed base station scenario, the access network device may be a baseband unit (base band unit, BBU) and a remote radio unit (RRU). In a cloud radio access network (CRAN) scenario, the access network device may be a baseband pool (BBU pool) and an RRU.

Figure 2:
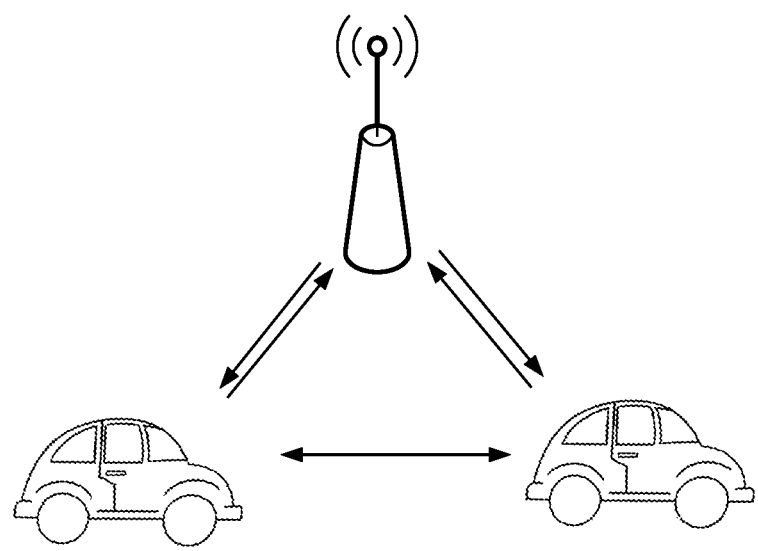
FIG. 2 is another schematic diagram of a communication system according to an embodiment of this application.

The communication systems shown in FIG. 1 and FIG. 2 may be used in a current long term evolution (LTE) system or a long term evolution-advanced (LTE Advanced, LTE-A) system, or may be used in a 5G network that is currently being formulated or another future network. Certainly, the communication system may be further used in an LTE and 5G hybrid networking system or another system. This is not specifically limited in the embodiments of this application. In different networks, the access network device and the terminal in the foregoing communication system may correspond to different names. A person skilled in the art may understand that the names do not constitute limitations on the devices.

A multicast service is introduced into a new radio vehicle to everything (NR V2X) system, to support a hybrid automatic repeat request (HARQ) technology. In NR V2X, HARQ information is carried through a physical sidelink feedback channel (PSFCH), data is transmitted through a physical sidelink shared channel (PSSCH), and control information is carried through a physical sidelink control channel (PSCCH).

The NR V2X system has two resource allocation modes:

Mode 1: An access network device schedules a sidelink resource. Specifically, a base station configures a resource pool to be used by a terminal. When sending data, the terminal needs to request, from the access network device, a resource used for sending the data. The access network device schedules a resource used on a sidelink, and allocates a specific resource position in a configured resource pool to the sidelink of the terminal.

Mode 2: A terminal independently selects a sidelink resource. Specifically, the terminal independently selects the sidelink resource from a resource pool configured on a network device side or a preconfigured resource pool.

Figure 3:
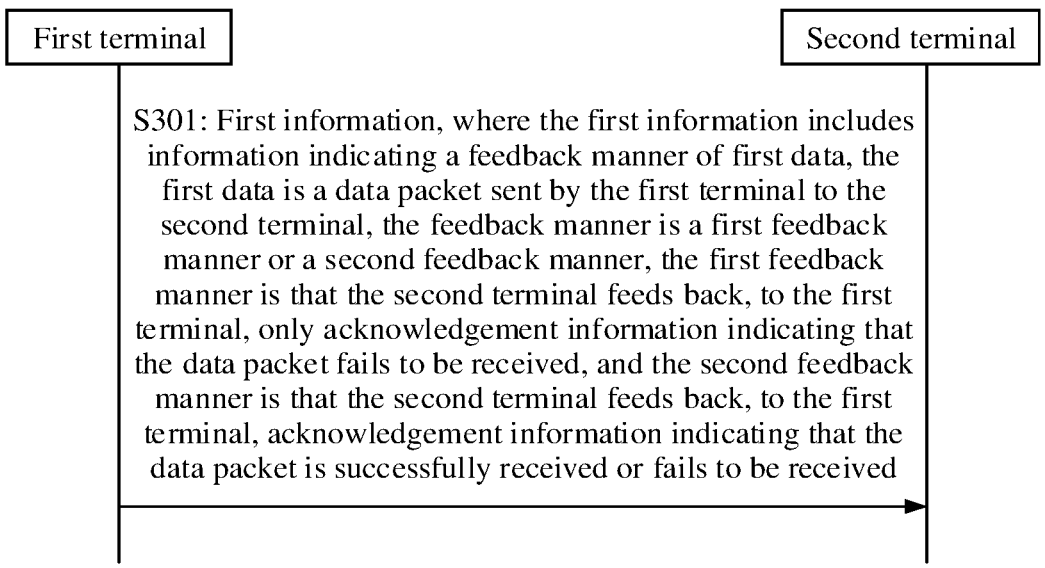
FIG. 3 is a first flowchart of a multicast feedback configuration method according to an embodiment of this application.
Figure 4:
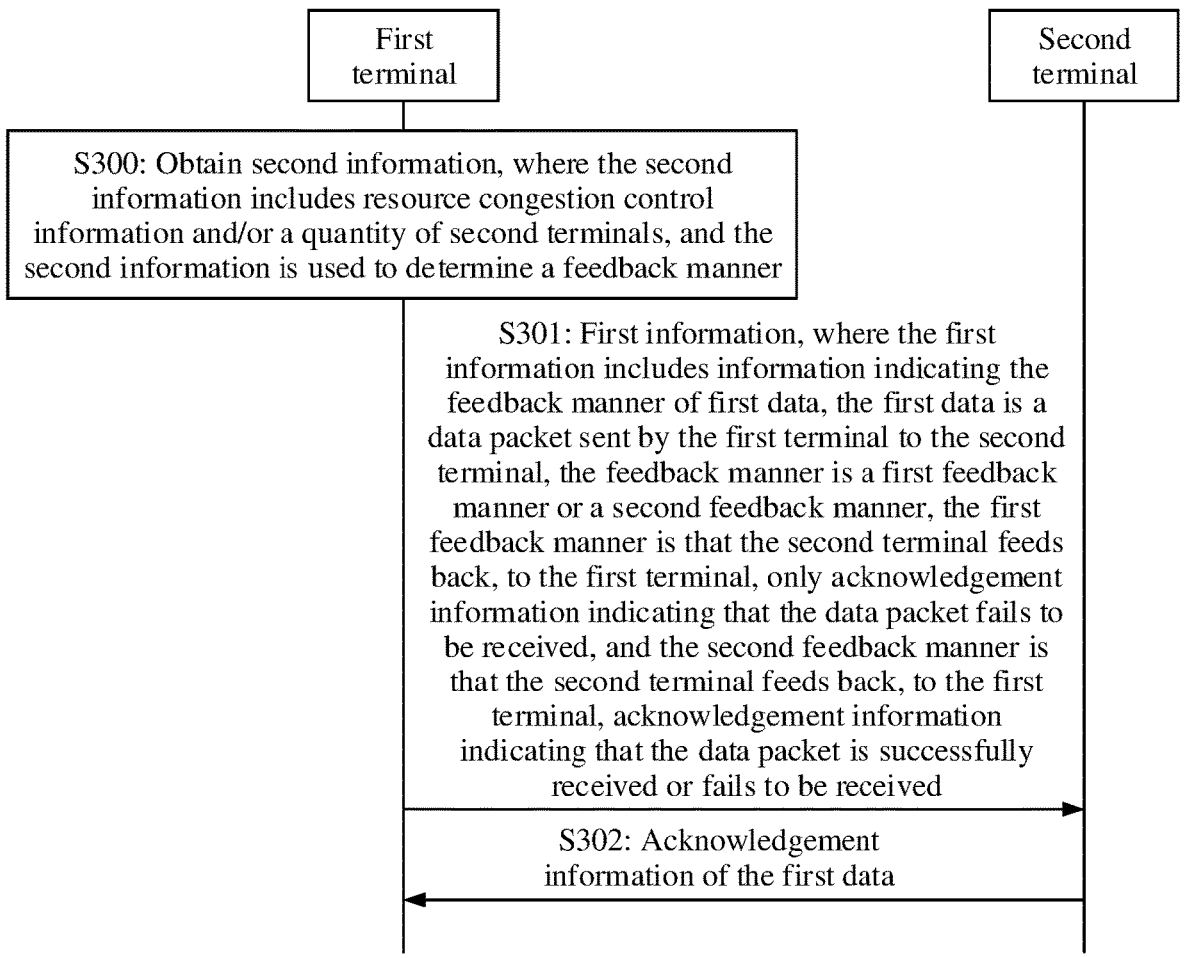
FIG. 4 is a second flowchart of a multicast feedback configuration method according to an embodiment of this application.

Referring to FIG. 3 and FIG. 4, a multicast feedback configuration method provided in an embodiment of this application is described below by using an example in which a first terminal indicates a multicast feedback manner in an NR V2X system.

S300: The first terminal obtains second information.

The second information includes resource congestion control information and/or a quantity of second terminals.

The resource congestion control information indicates a resource congestion status. For example, the resource congestion control information may include a CBR or a CR. Both the CBR and the CR may be measured by the first terminal.

The quantity of second terminals may be obtained by the first terminal in a multicast establishment process. In the multicast establishment process, the first terminal may further obtain information about each second terminal, for example, identifier information of each second terminal.

That the second information is used to determine the feedback manner may specifically include: The first terminal may determine the feedback manner of first data based on the resource congestion control information. Alternatively, the first terminal may determine the feedback manner of first data based on the quantity of second terminals. Alternatively, the first terminal may determine the feedback manner of first data based on the resource congestion control information and the quantity of second terminals.

The feedback manner is a first feedback manner or a second feedback manner.

In this way, the first terminal can determine the feedback manner based on the second information. If the resource congestion control information and the quantity of second terminals change, the feedback manner of the first data also changes. For example, when resources are insufficient or the quantity of second terminals is relatively large, the feedback manner may be the first feedback manner, and all the second terminals share a same feedback resource, to avoid a waste of resources. When a quantity of idle resources is relatively large and the quantity of second terminals is relatively small, the feedback manner may be the second feedback manner, and all the second terminals have respective dedicated feedback resources, to ensure reliable data transmission. In a current technology, a feedback manner used by a second terminal remains unchanged, and cannot be applicable to a channel status that changes in real time, resulting in low system operating efficiency and low resource utilization. Similarly, when different quantities of second terminals use the second feedback manner, required resource overheads are different. If the feedback manner remains unchanged, low system operating efficiency and low resource utilization are also caused. According to the multicast feedback configuration method provided in this embodiment of this application, the first terminal can configure the multicast feedback manner for the second terminal based on the resource congestion control information and the quantity of second terminals, to ensure the reliable data transmission and improve the resource utilization.

There are a plurality of specific implementations in which the first terminal may determine the feedback manner of the first data based on the resource congestion control information. Examples are used for description below.

In a first possible implementation, the resource congestion control information includes the CBR; and if the CBR is greater than a preset CBR critical value, the feedback manner is the first feedback manner; or if the CBR is less than or equal to a preset CBR critical value, the feedback manner is the second feedback manner.

The preset CBR critical value is a value prestored in the first terminal, or may be a value preconfigured by an access network device.

For example, the preset CBR critical value is 85%. At a moment, if a CBR measured by the first terminal is 90%, where 90% is greater than 85%, it indicates that a current channel is busy, system load is heavy, and the second terminals need to share a same feedback resource, to improve the resource utilization. In this case, the used feedback manner is the first feedback manner. At another moment, if a CBR measured by the first terminal is 80%, where 80% is less than 85%, it indicates that a current channel is relatively idle, and each second terminal can have its dedicated feedback resource, to ensure data transmission reliability. In this case, the used feedback manner is the second feedback manner. In this way, the first terminal determines the feedback manner based on the channel busy ratio, to improve the resource utilization, avoid the waste of resources, and ensure the data transmission reliability.

CBRs may represent different types of channel busy degrees. Therefore, when the CBRs represent different types of channel busy degrees, corresponding CBR critical values are independently preconfigured. The following describes "when the CBRs represents different types of channel busy degrees, the first terminal determines different feedback manners".

In a first possible design, the first terminal performs CBR measurement on a PSFCH, a PSSCH, and a PSCCH, to obtain a first CBR. In this case, if the first CBR is greater than a preset first CBR critical value, it indicates a high channel busy degree, the dedicated feedback resource of each second terminal increases a channel congestion degree and reduces HARQ feedback efficiency, so that all the second terminals share a same feedback resource, to relieve the channel congestion degree, and the feedback manner is the first feedback manner. If the first CBR is less than or equal to a preset first CBR critical value, it indicates a low channel busy degree, so that each second terminal can have its dedicated feedback resource, and the feedback manner is the second feedback manner, to ensure the data transmission reliability and avoid occurrence of a DTX feedback state.

For example, the preset first CBR critical value is 90%. At a moment, a first CBR measured by the first terminal is 92%, and 92% is greater than 90%. In this case, the first terminal determines that the feedback manner is the first feedback manner. At another moment, a first CBR measured by the first terminal is 80%, and 80% is less than 90%. In this case, the first terminal determines that the feedback manner is the second feedback manner.

In this way, the feedback manner is determined by the first terminal based on the overall channel busy degree of the PSFCH, the PSSCH, and the PSCCH, so that the feedback manner adapts to the overall channel busy degree of the three channels. When the overall channel busy degree of the three channels changes, the feedback manner also changes, to improve the system operating efficiency and the resource utilization.

In a second possible design, the first terminal performs CBR measurement on a PSFCH, to obtain a second CBR. In this case, if the second CBR is greater than a preset second CBR critical value, it indicates that a channel busy degree of the PSFCH is high and resources are insufficient; as a result, the dedicated feedback resource cannot be configured for each second terminal. To improve the resource utilization, all the second terminals need to share a same feedback resource, and the feedback manner is the first feedback manner. If the second CBR is less than or equal to a preset second CBR critical value, it indicates that a channel busy degree of the PSFCH is low, there are a relatively large quantity of idle resources, and the dedicated feedback resource can be configured for each second terminal. To ensure the data transmission reliability, each second terminal can have its dedicated feedback resource, and the feedback manner is the second feedback manner.

For example, the preset second CBR critical value is 87%. At a moment, a second CBR measured by the first terminal is 92%, and 92% is greater than 87%. In this case, the first terminal determines that the feedback manner is the first feedback manner. At another moment, a second CBR measured by the first terminal is 80%, and 80% is less than 87%. In this case, the first terminal determines that the feedback manner is the second feedback manner.

In this way, the feedback manner is determined by the first terminal based on the channel busy degree of the PSFCH, so that the feedback manner adapts to the channel busy degree of the PSFCH. When the channel busy degree of the PSFCH changes, the feedback manner also changes, to improve the system operating efficiency and the resource utilization.

In a third possible design, the first terminal performs CBR measurement on a PSFCH, to obtain a second CBR. The first terminal performs CBR measurement on a PSSCH and a PSCCH to obtain a third CBR. In this case, a specific implementation process in which the first terminal determines the feedback manner may further include: A CBR is determined based on the second CBR and the third CBR, and a corresponding CBR critical value is denoted as a third CBR critical value. If the CBR determined based on the second CBR and the third CBR is greater than the preset third CBR critical value, it indicates that an overall channel busy degree of the three channels is high and resources are insufficient; as a result, the dedicated feedback resource is no longer configured for each second terminal. To improve the resource utilization, all the second terminals need to share a same feedback resource, and the feedback manner is the first feedback manner. If the CBR determined based on the second CBR and the third CBR is less than or equal to the preset third CBR critical value, it indicates that an overall channel busy degree of the three channels is low, and there are a relatively large quantity of idle resources, so that the dedicated feedback resource can be configured for each second terminal. To ensure the data transmission reliability, each second terminal can have its dedicated feedback resource, and the feedback manner is the second feedback manner.

The CBR is determined based on the second CBR and the third CBR. The CBR, the second CBR, and the third CBR satisfy the following formula:

$$CBR = a \times CBR_2 + (1-a) \times CBR_3 \qquad (1)$$

CBR represents a value determined based on the second CBR and the third CBR, $CBR_2$ represents the second CBR, $CBR_3$ represents the third CBR, and a represents a weight coefficient. The weight coefficient a is a value preset in the first terminal.

For example, the preset third CBR critical value is 85%. At a moment, the first terminal measures a second CBR and a third CBR. A CBR obtained based on the second CBR and the third CBR is 87%, and 87% is greater than 85%. In this case, the first terminal determines that the feedback manner is the first feedback manner. At another moment, the first terminal measures a second CBR and a third CBR. A CBR obtained based on the second CBR and the third CBR is 80%, and 80% is less than 85%. In this case, the first terminal determines that the feedback manner is the second feedback manner.

In this way, the feedback manner is determined by the first terminal based on the overall channel busy degree of the three channels, so that the feedback manner adapts to the overall channel busy degree of the three channels. When the overall channel busy degree of the three channels changes, the feedback manner also changes, to improve the system operating efficiency and the resource utilization.

It should be noted that there may be a plurality of scenarios in which the access network device configures a resource pool. For example, a base station may configure a same resource pool for the three channels, namely, the PSSCH, the PSCCH, and the PSFCH, that is, one resource pool provides time-frequency resources of the three channels, namely, the PSSCH, the PSCCH, and the PSFCH. For another example, a base station may configure a same resource pool for the PSSCH and the PSCCH, and configure another resource pool for the PSFCH. When the three channels, namely, the PSSCH, the PSCCH, and the PSFCH share a same resource pool, the first terminal may determine the feedback manner in any one of the foregoing three possible designs. When the two channels, namely, the PSSCH and the PSCCH share a same resource pool, the first terminal may determine the feedback manner by using the foregoing second or third possible design.

It should be noted that the first terminal may separately perform CBR measurement on channels of different types. Specifically, the first terminal determines a corresponding CBR measurement manner based on a multiplexing manner of a PSCCH and a corresponding PSSCH and based on whether the PSSCH can occupy a preconfigured PSFCH resource. For example, the multiplexing manner of the PSCCH and the corresponding PSSCH is that an overlapping time domain resource in non-overlapping frequency domain resources is used to send the PSCCH and one part of the associated PSSCH, and a non-overlapping time domain resource is used to send the other part of the associated PSSCH. In this case, the first terminal needs to perform CBR measurement on the PSCCH and the PSSCH together. For another example, in the foregoing multiplexing manner of the PSCCH and the corresponding PSSCH, if a preconfigured PSFCH occupies a relatively small quantity of time-frequency resources, for example, occupies only one or more subcarriers on one subchannel and occupies only several time domain symbols, and there is a remaining preconfigured PSFCH resource. To avoid a waste of resources, the PSSCH may occupy the remaining PSFCH resource for transmission. In this case, the first terminal may perform signal strength measurement on the three channels, namely, the PSSCH, the PSSCH, and the PSFCH as a whole, to obtain an overall channel busy degree of the three channels, namely, the PSSCH, the PSSCH, and the PSFCH, and the first terminal does not need to separately perform CBR measurement on the PSFCH channel. For another example, when the preconfigured PSFCH resource can be used to send only the PSFCH, and cannot be used to send the PSCCH or the PSSCH, the first terminal needs to perform CBR measurement on the PSFCH in dimensions of a subchannel and a time domain symbol, to obtain a channel busy degree of the PSFCH.

In a second possible implementation, the resource congestion control information includes the CR, and that the feedback manner is determined based on the CR may be specifically: If the CR is greater than a preset CR critical value, the feedback manner is the first feedback manner.

The CR indicates a ratio of a quantity of subchannels actually occupied by the first terminal to a total quantity of subchannels in a preset measurement periodicity (for example, 1000 ms).

The preset CR critical value may be a value prestored in the first terminal, or may be a value obtained by the first terminal from an access network device.

For example, the preset CR critical value is 90%. At a moment, if a CR measured by the first terminal is 97%, where 97% is greater than 90%, it indicates that the first terminal occupies an excessively large quantity of resources. To avoid that a same terminal occupies an excessively large quantity of resources, and the dedicated feedback resource is no longer configured for each second terminal, all the second terminals share a same feedback resource, and the feedback manner is the first feedback manner.

In this way, the feedback manner is determined based on the CR, so that a terminal can be prevented from occupying an excessively large quantity of resources, and fairness of resource occupation by all terminals can be ensured.

In a third possible implementation, the resource congestion control information includes the CBR and the CR. If the CR is greater than a preset CR critical value, the feedback manner is the first feedback manner; if the CR is less than or equal to a preset CR critical value and the CBR is greater than a preset CBR critical value, the feedback manner is the first feedback manner; or if the CR is less than or equal to a preset CR critical value, and the CBR is less than or equal to a preset CBR critical value, the feedback manner is the second feedback manner.

For example, the preset CR critical value is 90%, and the preset CBR critical value is 87%. At a moment, if a CR measured by the first terminal is 92%, where 92% is greater than 90%, it indicates that the first terminal occupies an excessively large quantity of resources. To avoid that a same terminal occupies an excessively large quantity of resources, the dedicated feedback resource is no longer configured for each second terminal, all the second terminals share a same feedback resource, and the feedback manner is determined as the first feedback manner. At another moment, a CR measured by the first terminal is 70%, and a CBR measured by the first terminal is 90%, that is, the CR measured by the first terminal is less than a preset CR critical value (90%), and the CBR measured by the first terminal is greater than the preset CBR critical value (87%), it indicates that the first terminal does not occupy an excessively large quantity of resources, but a current channel is busy, and the second terminals need to share a same feedback resource. In this case, the used feedback manner is the first feedback manner.

At still another moment, a CR measured by the first terminal is 70%, and a CBR measured by the first terminal is 80%, that is, the CR measured by the first terminal is less than a preset CR critical value (90%), and the CBR measured by the first terminal is less than the preset CBR critical value (87%), it indicates that the first terminal does not occupy an excessively large quantity of resources, a current channel is idle, and each second terminal can have a dedicated feedback resource, to ensure the data transmission reliability. In this case, the used feedback manner is the second feedback manner. In addition, CBRs may indicate busy degrees of different types of channels. For a specific implementation process, refer to the foregoing three possible designs. Details are not described herein again.

A specific implementation process in which the first terminal may alternatively determine the feedback manner of the first data based on the quantity of second terminals is described below.

If the quantity of second terminals is greater than a preset quantity critical value, the feedback manner is the first feedback manner.

The quantity of second terminals is obtained by the first terminal in the multicast establishment process. The preset quantity critical value is a value preset in the first terminal, or may be a value received by the first terminal from the access network device.

For example, the quantity of second terminals is 150, and the preset quantity critical value is 100. In this case, the quantity of second terminals is greater than the preset quantity critical value, and the dedicated feedback resource is allocated to each second terminal, resulting in high resource overheads and low resource utilization. Therefore, all the second terminals need to share a same feedback resource, and the feedback manner is configured as the first feedback manner, that is, the second terminal feeds back, to the first terminal, only acknowledgement information indicating that a data packet fails to be received.

In this way, when the quantity of second terminals is greater than the preset quantity critical value, the first terminal determines that the feedback manner is the first feedback manner, to reduce time-frequency resources and improve time-frequency resource utilization.

A specific implementation process in which the first terminal may alternatively determine the feedback manner of the first data based on the resource congestion control information and the quantity of second terminals is described below.

If the quantity of second terminals is greater than a preset quantity critical value, the feedback manner is the first feedback manner.

If the quantity of second terminals is less than or equal to the preset quantity critical value, the feedback manner may be the first feedback manner, or may be the second feedback manner. Details are as follows:

If the quantity of second terminals falls within a first quantity interval, and a CBR is greater than a first CBR critical value, the feedback manner is the first feedback manner; or if the quantity of second terminals falls within a first quantity interval, and a CBR is less than or equal to a first CBR critical value, the feedback manner is the second feedback manner.

For example, the preset quantity critical value is 100, there may be one quantity interval of the second terminal, namely, [0, 100], and a CBR critical value corresponding to the quantity interval [0, 100] is $N_1$. If at a current moment, a quantity of second terminals obtained by the first terminal is 150, the quantity of second terminals is greater than the preset quantity critical value. In this case, the feedback manner is the first feedback manner, to reduce the time-frequency resources and improve the time-frequency resource utilization. For example, at a current moment, a quantity of second terminals obtained by the first terminal is 75, and a CBR obtained by the first terminal is No. The quantity of second terminals is less than the preset quantity critical value, and belongs to the quantity interval [0, 100]. The interval is denoted as a first quantity interval. If $N_0 > N_1$, the feedback manner is the first feedback manner. If $N_0 \leq N_1$, the feedback manner is the second feedback manner.

For example, the preset quantity critical value is 100, and there is at least one quantity interval of the second terminal. If there are two quantity intervals, namely, [0, 50) and [50, 100], a CBR critical value corresponding to the quantity interval [0, 50) is $N_{2-1}$, and a CBR critical value corresponding to the quantity interval [50, 100] is $N_{2-2}$. If at a current moment, a quantity of second terminals obtained by the first terminal is 150, the quantity of second terminals is greater than the preset quantity critical value. In this case, the feedback manner is the first feedback manner, to reduce the time-frequency resources and improve the time-frequency resource utilization. For example, at a current moment, a quantity of second terminals obtained by the first terminal is 75, and a CBR obtained by the first terminal is No. The quantity of second terminals is less than the preset quantity critical value, and belongs to the quantity interval [50, 100]. The interval is denoted as a first quantity interval. If $N_0 > N_{2-2}$, the feedback manner is the first feedback manner. If $N_0 \leq N_{2-2}$, the feedback manner is the second feedback manner. For example, at a current moment, a quantity of second terminals obtained by the first terminal is 25, and a CBR obtained by the first terminal is $N_0$. The quantity of second terminals is less than the preset quantity critical value, and belongs to the quantity interval [0, 50). The interval is denoted as a first quantity interval. If $N_0 > N_{2-1}$, the feedback manner is the first feedback manner. If $N_0 \leq N_{2-1}$, the feedback manner is the second feedback manner.

In this way, the first terminal can determine the feedback manner based on the resource congestion control information and the quantity of second terminals, so that the feedback manner used by the second terminal adapts to the dynamically changing channel status. In addition, when the feedback manner is the second feedback manner, different quantities of second terminals need to occupy different sizes of resources, and the first terminal can further determine the corresponding feedback manner based on the quantity of second terminals, to improve the resource utilization and avoid the waste of resources.

S301: The first terminal sends first information to the second terminal, and correspondingly, the second terminal receives the first information from the first terminal.

The first information includes information indicating the feedback manner of the first data. For example, the first information may be sidelink control information (SCI). The SCI can indicate a resource position of the PSSCH, and can further indicate the feedback manner of the first data. For example, referring to Table 1, the SCI includes at least two fields, for example, a field 1 and a field 2. The field 1 is used to indicate the resource position of the PSSCH, and the field 2 is used to indicate the feedback manner of the first data. The SCI may further include another field, for example, a field indicating a modulation and demodulation scheme. For example, referring to FIG. 9, the field 1 includes eight bits, and the eight bits are used to indicate the resource position of the PSSCH. The field 2 includes one bit, and the bit is used to indicate the feedback manner of the first data.

TABLE 1

| Fields included in the SCI | Function |
| --- | --- |
| Field 1 | Indicates the resource position of the PSSCH |
| Field 2 | Indicates the feedback manner of the first data |
| Another field | ... |

The SCI may indicate the feedback manner of the first data in a plurality of forms. For example, the SCI includes a preset field. If the preset field is set to a first preset value, it indicates that the feedback manner is the first feedback manner; or if the preset field is set to a second preset value, it indicates that the feedback manner is the second feedback manner. For another example, formats of the SCI include a first format and a second format; the SCI in the first format is used to indicate that the feedback manner is the first feedback manner; and the SCI in the second format is used to indicate that the feedback manner is the second feedback manner.

The first data is a data packet sent by the first terminal to the second terminal, for example, a data packet sent by the first terminal to the second terminal through multicast.

The feedback manner is the first feedback manner or the second feedback manner.

The first information is sidelink control information (SCI). There are a plurality of specific implementations of indicating the feedback manner by using the SCI. The following provides descriptions by using examples.

Figure 10:
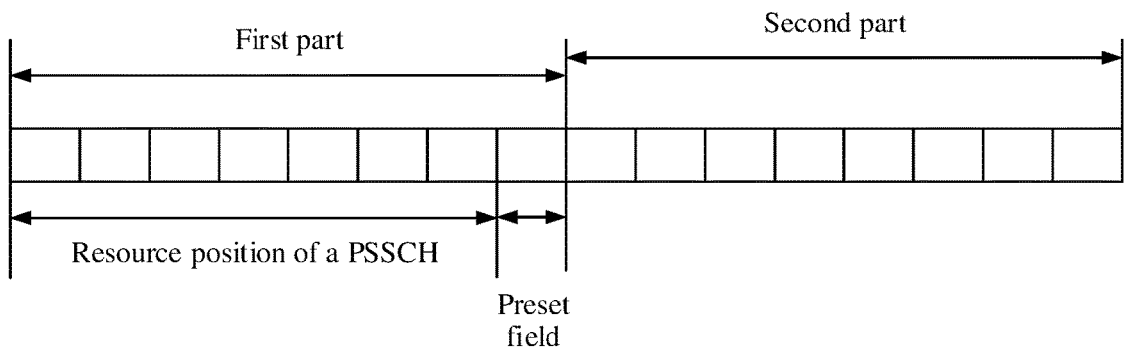
FIG. 10 is a schematic diagram of a signaling structure of sidelink control information according to an embodiment of this application.

In a first possible implementation, the SCI includes the preset field, and the preset field is used to carry the information indicating the feedback manner of the first data. A position of the preset field in the SCI may be set based on an actual application requirement. For example, referring to FIG. 10, the SCI is divided into a first part and a second part. The first part may include information about a resource position that is occupied for transmitting a data packet (namely, the PSSCH) and feedback manner indication information, and the second part may include a plurality of configuration parameters, for example, a configuration parameter required for decoding the data packet. The preset field may be the last field in the first part of the SCI.

Different values of the preset field indicate different feedback manners to be used by the second terminal. For example, the preset field is specifically implemented as one bit. When the bit is 1, it indicates that the feedback manner is the first feedback manner. When the bit is 0, it indicates that the feedback manner is the second feedback manner. In this way, the second terminal may obtain the feedback manner based on the value of the preset field.

Different values of the preset field indicate different feedback manners to be used by the second terminal. In this case, the SCI may further explicitly indicate a resource position of the PSFCH. For example, a field indicating a resource of the PSFCH is set. There may be one field indicating the resource of the PSFCH. When the bit (namely, the bit in the preset field indicating the feedback manner to be used by the second terminal) is 1, the second terminal can learn that the feedback manner is the first feedback manner, and then with reference to the resource position of the PSFCH that is indicated by the field indicating the resource of the PSFCH, the second terminal can learn of a time-frequency resource used for transmitting the acknowledgement information in the first feedback manner. Correspondingly, when the bit (namely, the bit in the preset field indicating the feedback manner to be used by the second terminal) is 0, the second terminal can learn that the feedback manner is the second feedback manner, and then with reference to the resource position of the PSFCH that is indicated by the field indicating the resource of the PSFCH, the second terminal can learn of a time-frequency resource used for transmitting the acknowledgement information in the second feedback manner. In addition, when the resource position of the PSFCH and the resource position of the PSCCH are implicitly associated, the field indicating the resource position of the PSFCH does not need to be set in the SCI. The second terminal performs blind detection to obtain a resource position occupied by the SCI. Because the resource position of the PSCCH for transmitting the SCI is implicitly associated with the resource position of the PSFCH, the second terminal can obtain the resource position of the PSFCH based on a preconfigured mapping rule and the resource position of the PSCCH for transmitting the SCI, so that the field indicating the resource of the PSFCH does not need to be set in the SCI. In this way, resources consumed during transmission of the SCI are reduced. Correspondingly, when the resource position of the PSFCH and the resource position of the PSSCH are implicitly associated, the field indicating the resource position of the PSFCH does not need to be set in the SCI. The SCI indicates a resource occupied for transmitting the data packet, that is, the SCI indicates the resource position of the PSSCH. Therefore, the second terminal can also obtain the resource position of the PSFCH based on a preconfigured mapping rule and the resource position that is of the PSSCH and that is indicated in the SCI. For a specific procedure in which the second terminal performs blind detection to obtain the resource position occupied by the SCI, and obtains the resource position of the PSFCH based on the preconfigured mapping rule and the resource position of the PSCCH for transmitting the SCI, refer to the current technology. Details are not described herein.

Figure 11:
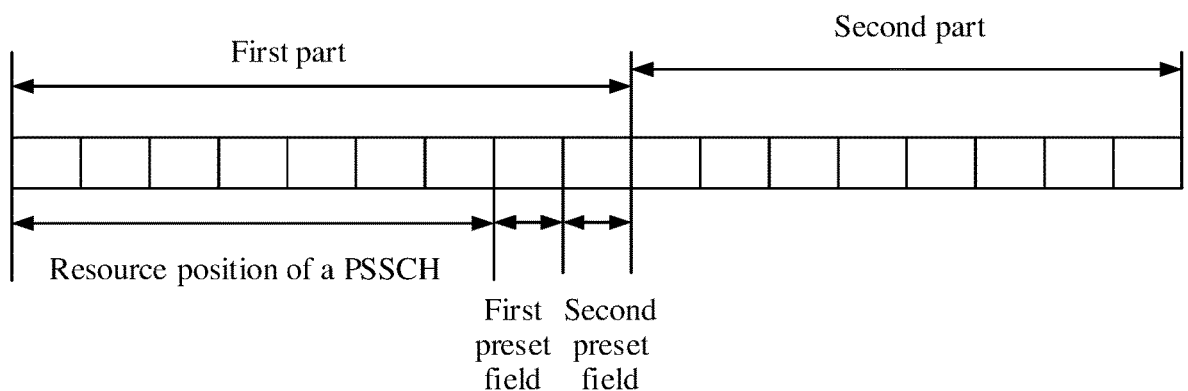
FIG. 11 is a schematic diagram of a signaling structure of sidelink control information according to an embodiment of this application.

The preset field included in the SCI can also explicitly indicate the resource position of the PSFCH, to transmit acknowledgement information in different feedback manners. The preset field includes a first preset field and a second preset field. The first preset field is used to indicate a resource to be used by a PSFCH for transmitting the acknowledgement information in the first feedback manner, and the second preset field is used to indicate a resource to be used by the PSFCH for transmitting the acknowledgement information in the second feedback manner. For example, FIG. 11 shows positions of the first preset field and the second preset field in the SCI. The positions of both the first preset field and the second preset field in the SCI are according to a preset rule, and both the first terminal and the second terminal prestore the rule. For example, the first preset field is before the second preset field. In this case, the first terminal cannot only indicate the feedback manner to be used by the second terminal, and further indicate the time-frequency resource to be used by the second terminal to transmit the feedback information in the first feedback manner or the second feedback manner.

Figure 9:
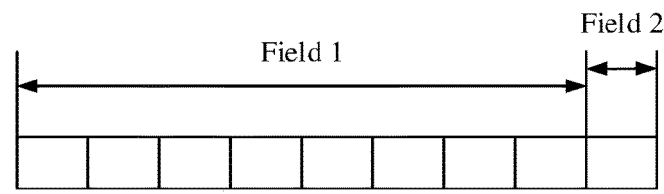
FIG. 9 is a schematic diagram of a signaling structure of sidelink control information according to an embodiment of this application.
Figure 12:
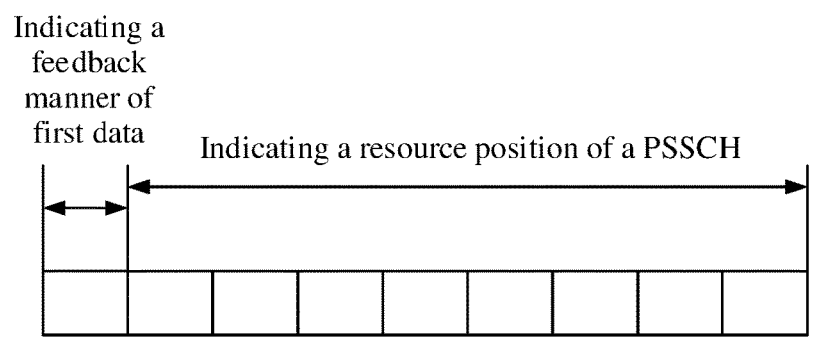
FIG. 12 is a schematic diagram of a signaling structure of sidelink control information according to an embodiment of this application.

In a second possible implementation, formats of the SCI include the first format and the second format; the SCI in the first format is used to indicate that the feedback manner to be used by the second terminal is the first feedback manner; and the SCI in the second format is used to indicate that the feedback manner to be used by the second terminal is the second feedback manner. For example, the SCI in the first format may be as follows: In nine adjacent bits, the first eight bits indicate the resource position of the PSSCH, and the last one bit indicates the feedback manner of the first data, as shown in FIG. 9. The SCI in the second format may be: In nine adjacent bits, the first bit indicates the feedback manner of the first data, and the last eight bits indicate the resource position of the PSSCH, as shown in FIG. 12.

In this way, the first terminal indicates different feedback manners to be used by the second terminal by using the SCI in different formats, so that the second terminal feeds back a receiving status of the first data.

In a third possible implementation, the SCI includes format information of the PSFCH, and the format information of the PSFCH includes a first format and a second format, the PSFCH in the first format is used to indicate that the feedback manner to be used by the second terminal is the first feedback manner; and the PSFCH in the second format is used to indicate that the feedback manner to be used by the second terminal is the second feedback manner.

The format information of the PSFCH may be specifically a format index. For example, when the resource position of the PSFCH and the resource positions of the PSCCH and the PSSCH are implicitly associated, each format index corresponds to time domain and frequency domain resource positions occupied by the PSFCH and a format of the PSFCH. For example, referring to Table 2, when the format index is 1, it indicates that the time domain resource position occupied by the PSFCH is a1, the frequency domain resource position is b1, and the format information of the PSFCH is the first format. When the format index is 2, it indicates that the time domain resource position occupied by the PSFCH is a2, the frequency domain resource position is b2, and the format information of the PSFCH is the second format. When determining that the feedback manner is the first feedback manner, the first terminal may send the SCI to the second terminal. In this case, the format information that is of the PSFCH and that is carried in the SCI is the first format. After receiving the SCI, the second terminal may determine the resource position of the PSFCH and the feedback manner with reference to Table 2.

TABLE 2

| Format index | Resource position occupied by the PSFCH | Format information of the PSFCH |
| --- | --- | --- |
| 1 | Time domain resource position a1 Frequency domain resource position b1 | First format |
| 2 | Time domain resource position a2 Frequency domain resource position b2 | Second format |

For example, when the resource position of the PSFCH and the resource position of the PSCCH or the PSSCH are implicitly associated, each format index corresponds to one format of the PSFCH. For example, referring to Table 3, when the format index is 1, it indicates that the format information of the PSFCH is the first format. When the format index is 2, it indicates that the format information of the PSFCH is the second format. When determining that the feedback manner is the first feedback manner, the first terminal may send the SCI to the second terminal. In this case, the format information that is of the PSFCH and that is carried in the SCI is the first format. After receiving the SCI, the second terminal may determine the feedback manner with reference to Table 3. When the resource position of the PSFCH and the resource position of the PSCCH are implicitly associated, the second terminal may determine the resource position of the PSFCH based on the resource position of the PSCCH. Similarly, when the resource position of the PSFCH and the resource position of the PSSCH are implicitly associated, the second terminal may determine the resource position of the PSFCH based on the resource position of the PSSCH. For detailed processes in which the second terminal may determine the resource position of the PSFCH based on the resource position of the PSCCH and the second terminal may determine the resource position of the PSFCH based on the resource position of the PSSCH, refer to a current technology. Details are not described herein.

TABLE 3

| Format index | Format information of the PSFCH |
|---|---|
| 1 | First format |
| 2 | Second format |

In this way, the first terminal indicates, by carrying different format information of the PSFCH, different feedback manners to be used by the second terminal, so that the second terminal feeds back a receiving status of the first data.

It should be noted that, if the data packet has a relatively high priority, to ensure the data transmission reliability, the first terminal may directly configure the feedback manner as the second feedback manner.

S302: The second terminal feeds back acknowledgement information of the first data to the first terminal in the feedback manner indicated by the first information.

Correspondingly, the first terminal receives the acknowledgement information of the first data from the second terminal, to determine whether to retransmit the first data.

For example, the feedback manner is the first feedback manner. To be specific, the second terminal feeds back, to the first terminal, only acknowledgement information indicating that the data packet fails to be received, and all the second terminals share a same feedback resource. For example, after the first terminal sends the data packet to the second terminal through multicast, if the second terminal successfully receives the data packet, the second terminal does not need to feed back any acknowledgement information to the first terminal; or if the second terminal fails to receive the data packet, the second terminal feeds back, to the first terminal, the acknowledgement information indicating that the data packet fails to be received, that is, a NACK. After the first terminal receives the acknowledgement information that is fed back by the second terminal and that indicates that the data packet fails to be received, the first terminal retransmits the data packet, so that the second terminal successfully receives the data packet, thereby improving the time-frequency resource utilization, and avoiding the waste of time-frequency resources.

For example, the feedback manner is the second feedback manner. To be specific, the second terminal feeds back, to the first terminal, acknowledgement information indicating that the data packet is successfully received or fails to be received, and each second terminal has a dedicated resource for feeding back an ACK/the NACK. For example, after the first terminal sends the data packet to the second terminal through multicast, if the second terminal successfully receives the data packet, the second terminal feeds back the acknowledgement information, namely, the ACK, to the first terminal; or if the second terminal fails to receive the data packet, the second terminal feeds back, to the first terminal, the acknowledgement information indicating that the data packet fails to be received, namely, the NACK. After the first terminal receives the acknowledgement information that is fed back by the second terminal and that indicates that the data packet fails to be received, the first terminal retransmits the data packet, so that the second terminal successfully receives the data packet, thereby ensuring the data transmission reliability.

It should be noted that before "S301 of sending, by the first terminal, first information to the second terminal", the feedback manner used by the second terminal by default is the first feedback manner. After receiving the first information from the first terminal, the second terminal feeds back the acknowledgement information of the first data to the first terminal in the feedback manner indicated by the first information. To be specific, when the feedback manner indicated by the first information is the first feedback manner, the second terminal still feeds back the acknowledgement information of the first data to the first terminal in the first feedback manner; or when the feedback manner indicated by the first information is the second feedback manner, the second terminal switches the feedback manner from the first feedback manner to the second feedback manner, and feeds back the acknowledgement information of the first data to the first terminal in the second feedback manner.

According to the multicast feedback configuration method provided in the embodiments of this application, the first terminal sends the first information to the second terminal, where the first information includes the information indicating the feedback manner of the first data, the first data is the data packet sent by the first terminal to the second terminal, the feedback manner is the first feedback manner or the second feedback manner, the first feedback manner is that the second terminal feeds back, to the first terminal, only the acknowledgement information indicating that the data packet fails to be received, and the second feedback manner is that the second terminal feeds back, to the first terminal, the acknowledgement information indicating that the data packet is successfully received or fails to be received. In a current technology, a feedback manner used by a second terminal remains unchanged, and cannot be applicable to a channel status that changes in real time, resulting in low system operating efficiency and low resource utilization. In addition, when quantities of second terminals are different, sizes of resources required for different feedback manners are also different. If the feedback manner used by the second terminal remains unchanged, low resource utilization is also caused. According to the multicast feedback configuration method provided in this embodiment of this application, the first terminal can send the first information to the second terminal, to indicate the feedback manner of the first data. It can be learned that the first terminal can dynamically indicate the feedback manner to be used by the second terminal, and the feedback manner used by the second terminal no longer remains unchanged, so that the feedback manner is adapted to the dynamically changing channel status. For example, when a relatively large quantity of resources are occupied, the first terminal may indicate the second terminal to use the first feedback manner, to avoid the waste of resources. When a relatively small quantity of resources are occupied, the first terminal may indicate the second terminal to use the second feedback manner, to ensure the data transmission reliability. Similarly, the first terminal can further consider resource overheads required by different quantities of second terminals, to dynamically adjust the feedback manner. For example, when there are a relatively large quantity of second terminals, the first terminal may indicate the second terminal to use the first feedback manner, to avoid the waste of resources. When there are a relatively small quantity of second terminals, the first terminal may indicate the second terminal to use the second feedback manner, to ensure the data transmission reliability.

Figure 5:
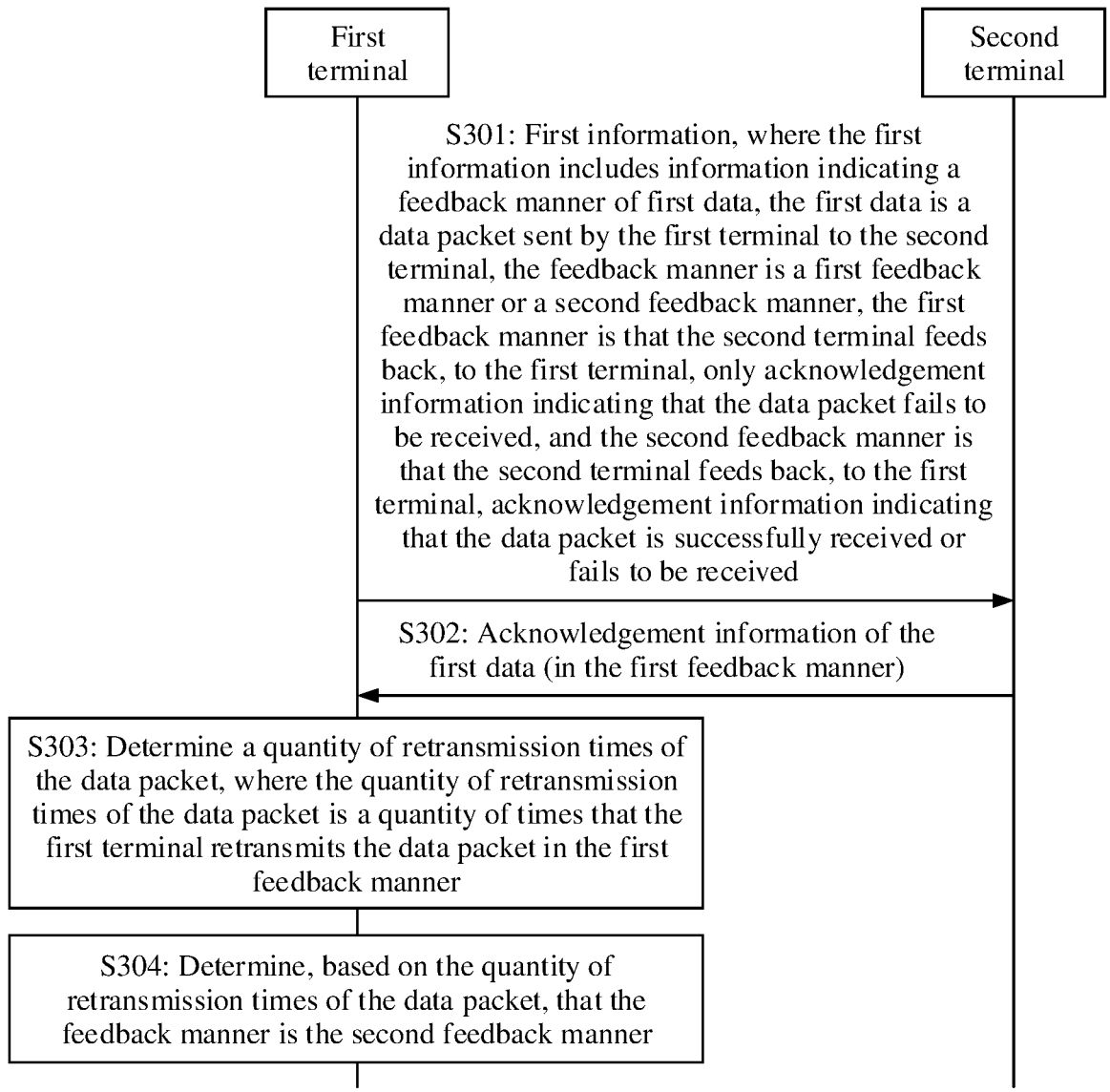
FIG. 5 is a third flowchart of a multicast feedback configuration method according to an embodiment of this application.

In addition, referring to FIG. 5, when the second terminal uses the first feedback manner, provided that the first terminal receives the NACK fed back by the second terminal, the first terminal retransmits the data packet once, so that the second terminal successfully receives the data packet. If the first terminal retransmits the data packet for an excessively large quantity of times, the feedback manner is switched, to be specific, the second terminal is indicated to switch from the first feedback manner to the second feedback manner, so that the first terminal identifies the second terminal that fails to receive the data packet. A specific implementation process is as follows:

S303: The first terminal determines a quantity of retransmission times of the data packet.

The quantity of retransmission times of the data packet is a quantity of times that the first terminal retransmits the data packet in the first feedback manner.

For example, when the feedback manner is the first feedback manner, and one or more second terminals fail to receive the data packet, the second terminal that fails to receive the data packet feeds back, to the first terminal, the acknowledgement information indicating that the data packet fails to be received (namely, the NACK), and the first terminal retransmits the data packet and records a quantity of retransmission times of the data packet.

S304: The first terminal determines, based on the quantity of retransmission times of the data packet, that the feedback manner is the second feedback manner.

If the quantity of retransmission times of the data packet is greater than a preset quantity of retransmission times, the first terminal determines that the feedback manner is the second feedback manner.

For example, the preset quantity of retransmission times is 10, and the first terminal counts that a quantity of retransmission times of a data packet is 11. In this case, the quantity of retransmission times of the data packet is greater than the preset quantity of retransmission times, and the first terminal determines that the feedback manner is the second feedback manner.

In this way, because the second feedback manner is that each second terminal has its dedicated feedback resource, the first terminal can determine, based on the feedback information of each second terminal, the second terminal that fails to receive the data packet, to facilitate adjustment of a transmission manner used by the second terminal that fails to receive the data packet. For example, a data packet is sent, through unicast, to the second terminal that fails to receive the data packet, to ensure the data transmission reliability. For a detailed procedure in which the first terminal sends, through unicast, the data packet to the second terminal that fails to receive the data packet, refer to a current technology. Details are not described herein.

It should be noted that, if the quantity of retransmission times of the data packet is greater than the preset quantity of retransmission times, the first terminal may alternatively send the data packet to the second terminal through blind retransmission. A specific implementation process may include: If the quantity of retransmission times of the data packet is greater than the preset quantity of retransmission times, the first terminal sends the data packet to the second terminal based on a specified quantity of times, and a HARQ mechanism is in a disabled state. That is, the second terminal does not need to feed back, to the first terminal, the acknowledgement information indicating that the data packet is successfully received or fails to be received. For a detailed procedure in which the first terminal sends the data packet to the second terminal through blind retransmission, refer to a current technology. Details are not described herein.

Alternatively, if the quantity of retransmission times of the data packet is greater than the preset quantity of retransmission times, the first terminal may alternatively determine a forwarding terminal, and send, through the forwarding terminal, the data packet to the second terminal that fails to receive the data packet. A specific implementation process may include: The first terminal selects one terminal, serving as the forwarding terminal, from the second terminals based on geographical location information or signal strength information of all the second terminals, where the forwarding terminal is a terminal whose geographical location information or signal strength information is between the first terminal and the second terminal that fails to receive the data packet. The first terminal sends the data packet to the forwarding terminal. After receiving the data packet from the first terminal, the forwarding terminal sends the data packet to the second terminal that fails to receive the data packet, to ensure that each second terminal can successfully receive the data packet. For a detailed procedure in which the first terminal determines the forwarding terminal, and sends, through the forwarding terminal, the data packet to the second terminal that fails to receive the data packet, refer to a current technology. Details are not described herein.

For example, the first terminal sends, to the forwarding terminal, the data packet, information indicating to forward the data packet, and destination identifier information of the second terminal that fails to receive the data packet. After receiving the data packet from the first terminal, the forwarding terminal sends the data packet to the second terminal that fails to receive the data packet. In this case, the HARQ mechanism is disabled, and a quantity of times that the forwarding terminal retransmits, through blind retransmission, the data packet to the second terminal that fails to receive the data packet may be a fixed preconfigured quantity of times, to ensure reliability of receiving the data by the second terminal.

Alternatively, the first terminal sends, to the forwarding terminal, the data packet, information indicating to forward the data packet, and a quantity of blind retransmission times. After receiving the packet from the first terminal, the forwarding terminal blindly retransmits the data packet through multicast or broadcast.

Similarly, the feedback manner used by the second terminal is the second feedback manner. If the second terminal fails to receive the data packet from the first terminal, the second terminal feeds back the NACK to the first terminal, and the first terminal also retransmits the data packet. If the quantity of retransmission times of the data packet is greater than the preset quantity of retransmission times, the first terminal may alternatively adjust the transmission manner used by the second terminal that fails to receive the data packet, for example, the second terminal use the unicast manner or the blind retransmission manner, to ensure the data transmission reliability.

It should be noted that there are two resource allocation modes in the NR V2X system. A specific implementation process in which the first terminal indicates the feedback manner to be used by the second terminal in the NR V2X system is applicable to the resource allocation mode 2, that is, to a scenario in which the first terminal autonomously selects a sidelink resource.

Figure 6:
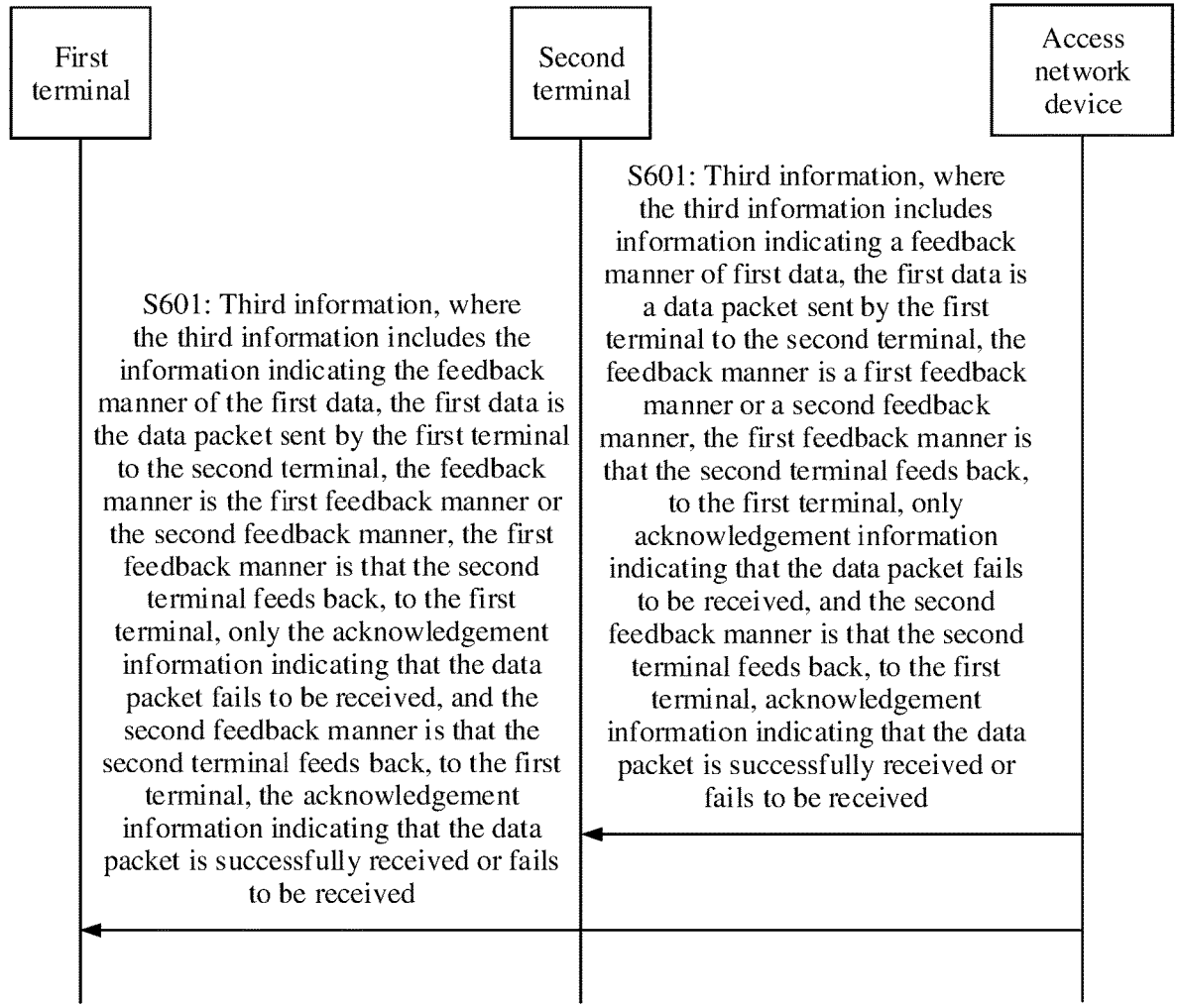
FIG. 6 is a fourth flowchart of a multicast feedback configuration method according to an embodiment of this application.
Figure 7:
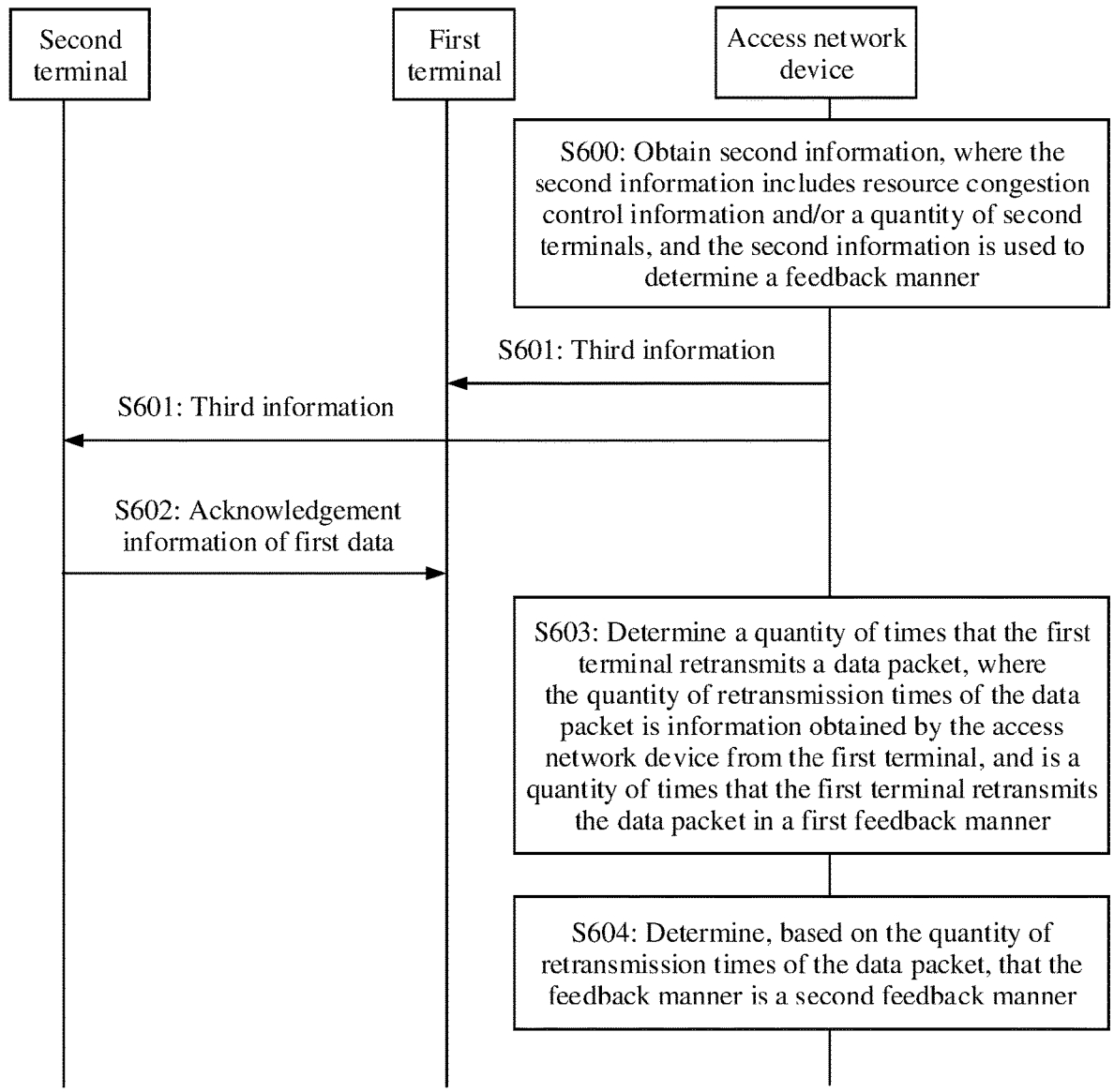
FIG. 7 is a fifth flowchart of a multicast feedback configuration method according to an embodiment of this application.

Referring to FIG. 6 or FIG. 7, a multicast feedback configuration method provided in an embodiment of this application is described below by using an example in which in an NR V2X system, a first terminal sends a data packet to a second terminal through multicast, and an access network device indicates a multicast feedback manner.

S600: The access network device obtains second information.

The second information includes resource congestion control information and/or a quantity of second terminals, the second information is used to determine the feedback manner, and the feedback manner is a first feedback manner or a second feedback manner.

The first terminal sends the resource congestion control information to the access network device, and the access network device may receive the resource congestion control information measured by the first terminal. The resource congestion control information may specifically include a CBR or a CR.

The quantity of second terminals dynamically changes, and the quantity of second terminals is obtained by the access network device from the first terminal.

For a specific implementation process of S600, refer to S300. Details are not described herein again.

S601: The access network device sends third information to the first terminal and the second terminal, and correspondingly, both the first terminal and the second terminal can receive the third information from the access network device.

The third information includes information indicating the feedback manner of first data. For example, the third information may be specifically downlink control information (DCI). Herein, the DCI is control information sent by the access network device to the first terminal when the first terminal requests, from the access network device, a resource used for sending a data packet, to indicate, to the first terminal, a position of the resource for transmitting the data packet. In addition, the DCI further carries the information indicating the feedback manner of the first data.

The first data is a data packet sent by the first terminal to the second terminal, for example, a data packet sent by the first terminal to the second terminal through multicast.

The feedback manner is the first feedback manner or the second feedback manner.

S602: The second terminal feeds back acknowledgement information of the first data to the first terminal in the feedback manner indicated by the third information.

Correspondingly, the first terminal receives the acknowledgement information of the first data from the second terminal, to determine whether to retransmit the first data.

For a specific implementation process of S602, refer to S302. Details are not described herein again.

According to the multicast feedback configuration method provided in this embodiment of this application, the access network device sends the third information to the first terminal and the second terminal. The third information includes the information indicating the feedback manner of the first data, the first data is the data packet sent by the first terminal to the second terminal, the feedback manner is the first feedback manner or the second feedback manner, the first feedback manner is that the second terminal feeds back, to the first terminal, only acknowledgement information indicating that the data packet fails to be received, and the second feedback manner is that the second terminal feeds back, to the first terminal, acknowledgement information indicating that the data packet is successfully received or fails to be received. In a current technology, a feedback manner used by a second terminal remains unchanged, and cannot be applicable to a channel status that changes in real time, resulting in low system operating efficiency and low resource utilization. In addition, when quantities of second terminals are different, sizes of resources required for different feedback manners are also different. If the feedback manner used by the second terminal remains unchanged, low resource utilization is also caused. According to the multicast feedback configuration method provided in this embodiment of this application, the access network device can send the third information to the first terminal and the second terminal, to indicate the feedback manner of the first data. It can be learned that the access network device can dynamically indicate the feedback manner to be used by the second terminal, and the feedback manner used by the second terminal no longer remains unchanged, so that the feedback manner is adapted to the dynamically changing channel status. For example, when a relatively large quantity of resources are occupied, the access network device may indicate the second terminal to use the first feedback manner, to avoid a waste of resources. When a relatively small quantity of resources are occupied, the access network device may indicate the second terminal to use the second feedback manner, to ensure data transmission reliability. Similarly, the access network device can further consider resource overheads required by different quantities of second terminals, to dynamically adjust the feedback manner. For example, when there are a relatively large quantity of second terminals, the access network device may indicate the second terminal to use the first feedback manner, to avoid the waste of resources. When there are a relatively small quantity of second terminals, the access network device may indicate the second terminal to use the second feedback manner, to ensure the data transmission reliability.

In addition, referring to FIG. 7, when the second terminal uses the first feedback manner, provided that the first terminal receives a NACK fed back by the second terminal, the first terminal retransmits the data packet once, so that the second terminal successfully receives the data packet. If the first terminal retransmits the data packet for an excessively large quantity of times, the feedback manner is switched, to be specific, the second terminal is indicated to switch from the first feedback manner to the second feedback manner, so that the first terminal identifies the second terminal that fails to receive the data packet. A specific implementation process is as follows:

S603: The access network device determines a quantity of times that the first terminal retransmits the data packet.

The quantity of retransmission times of the data packet is determined by the access network device based on a quantity of times of configuring a retransmission resource of the data packet, and is a quantity of times that the first terminal retransmits the data packet in the first feedback manner.

For example, the feedback manner is the first feedback manner. When one or more second terminals fail to receive the data packet, the second terminal that fails to receive the data packet feeds back, to the first terminal, the acknowledgement information indicating that the data packet fails to be received, and the first terminal retransmits the data packet and records a quantity of retransmission times of the data packet; or the access network device determines a quantity of retransmission times of the data packet based on the quantity of times of configuring the retransmission resource of the data packet.

S604: The access network device determines, based on the quantity of retransmission times of the data packet, that the feedback manner is the second feedback manner.

If the quantity of retransmission times of the data packet is greater than a preset quantity of retransmission times, the access network device determines that the feedback manner is the second feedback manner.

For example, the preset quantity of retransmission times is 10, and the access network device determines that the quantity of times that the first terminal retransmits a data packet is 11. In this case, the quantity of retransmission times of the data packet is greater than the preset quantity of retransmission times, and the access network device determines that the feedback manner is the second feedback manner.

In this way, because the second feedback manner is that each second terminal has its dedicated feedback resource, the access network device determines that the feedback manner used by the second terminal is the second feedback manner, so that the first terminal can determine, based on the feedback information of each second terminal, the second terminal that fails to receive the data packet, to facilitate adjustment of a transmission manner used by the second terminal that fails to receive the data packet. For example, a data packet is sent, through unicast, to the second terminal that fails to receive the data packet, to ensure the data transmission reliability. For a detailed procedure in which the first terminal sends, through unicast, the data packet to the second terminal that fails to receive the data packet, refer to a current technology. Details are not described herein.

Figure 8:
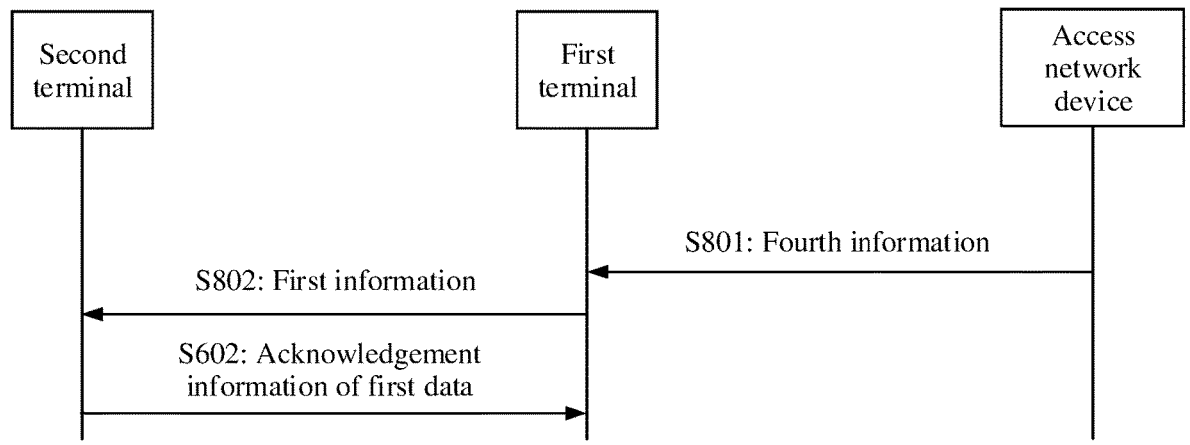
FIG. 8 is a sixth flowchart of a multicast feedback configuration method according to an embodiment of this application.

In addition, referring to FIG. 8, "S601 of sending, by the access network device, third information to the first terminal and the second terminal" may alternatively be replaced with S801 and S802. A specific implementation process is as follows:

S801: The access network device sends fourth information to the first terminal, and correspondingly, the first terminal receives the fourth information from the access network device.

The fourth information includes information indicating the feedback manner of first data. For example, the fourth information may be DCI, a SIB of system information, an MIB of system information, RRC signaling, or MAC signaling.

The first data is a data packet sent by the first terminal to the second terminal, for example, a data packet sent by the first terminal to the second terminal through multicast.

The feedback manner is a first feedback manner or a second feedback manner.

The fourth information may be in a plurality of forms. The following describes specific implementation forms of the fourth information.

In a first possible implementation, the fourth information may be downlink control information DCI. The DCI cannot only indicate a resource position used during data packet transmission through multicast, but also indicate the multicast feedback manner. In this way, the access network device notifies the first terminal and the second terminal of the multicast feedback manner by sending the DCI, to dynamically indicate the multicast feedback manner.

In a second possible implementation, the fourth information may be system information. A master information block MIB of the system information includes the information indicating the feedback manner to be used by the second terminal, or a system information block SIB of the system information includes the information indicating the feedback manner to be used by the second terminal. In this way, the access network device notifies the first terminal of the multicast feedback manner by transmitting the system information, to dynamically indicate the multicast feedback manner.

In a third possible implementation, the fourth information may be radio resource control (RRC) signaling, where the RRC signaling includes the information indicating the feedback manner to be used by the second terminal. For example, the RRC signaling includes a plurality of information elements (IE), and the information about the feedback manner to be used by the second terminal is carried by using an information element. Alternatively, enabling and disabling information of the second feedback manner is carried by using an information element. If it indicates that the second feedback manner is enabled, the second feedback manner is used for multicast; otherwise, the first feedback manner is used. Alternatively, the fourth information is medium access control (MAC) signaling, and the MAC signaling includes the information indicating the feedback manner to be used by the second terminal. For example, the MAC signaling includes a plurality of control elements (CE), and the information about the feedback manner to be used by the second terminal is carried by using a control element. In this way, the access network device notifies the first terminal of the multicast feedback manner by using the MAC signaling or the RRC signaling, to dynamically indicate the multicast feedback manner.

S802: The first terminal sends first information to the second terminal, and correspondingly, the second terminal receives the first information from the first terminal.

The first information includes the information indicating the feedback manner of the first data. For example, the first information may be SCI. There are a plurality of specific implementations of indicating the feedback manner by using the SCI. For details, refer to related descriptions of S301. Details are not described herein again.

In this way, the access network device sends the fourth information to the first terminal through a downlink, and then the first terminal transmits the first information to the second terminal through a sidelink. Both the first information and the fourth information include the information indicating the feedback manner of the first data, so that the second terminal obtains the feedback manner of the first data.

It should be noted that there are two resource allocation modes in the NR V2X system. A specific implementation process in which the access network device indicates the feedback manner to be used by the second terminal in the NR V2X system is applicable to the resource allocation mode 1, that is, to a scenario in which the access network device schedules a sidelink resource.

The solutions provided in the embodiments of this application are described above mainly from a perspective of interaction between different network elements. It may be understood that, to implement the foregoing functions, the first terminal apparatus and the second terminal apparatus include corresponding hardware structures and/or software units for performing the functions. With reference to the units and algorithm steps described in the embodiments disclosed in this application, the embodiments of this application can be implemented in a form of hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the technical solutions of the embodiments of this application.

In the embodiments of this application, a multicast feedback configuration apparatus may be divided into function units based on the foregoing method example. For example, each function unit may be obtained through division based on a corresponding function, or two or more functions may be integrated into one processing unit. The integrated unit may be implemented in a form of hardware, or may be implemented in a form of a software function unit. It should be noted that, in the embodiments of this application, unit division is an example, and is merely logical function division. In an actual implementation, another division manner may be used.

Figure 13:
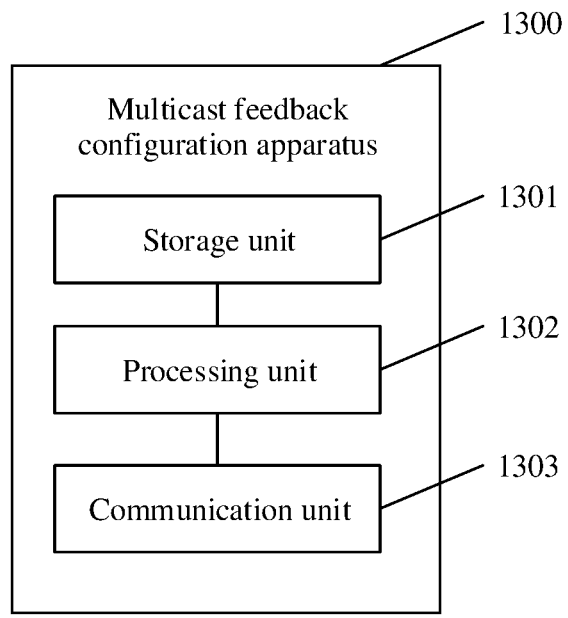
FIG. 13 is a schematic structural diagram of a multicast feedback configuration apparatus according to an embodiment of this application.

FIG. 13 is a schematic block diagram of a multicast feedback configuration apparatus according to an embodiment of this application. The multicast feedback configuration apparatus 1300 may exist in a form of software, a device, or a component (for example, a chip system) in a device. The multicast feedback configuration apparatus 1300 includes a processing unit 1302 and a communication unit 1303.

The communication unit 1303 may be further divided into a sending unit (not shown in FIG. 13) and a receiving unit (not shown in FIG. 13). The sending unit is configured to support the communication apparatus 1300 in sending information to another network element. The receiving unit is configured to support the communication apparatus 1300 in receiving information from another network element.

When the multicast feedback configuration apparatus 1300 is configured to implement a function of the foregoing first terminal, for example, the processing unit 1302 may be configured to support the apparatus 1300 in performing S303 and S304 in FIG. 5, and/or another process used for the solution described in this specification. The communication unit 1303 is configured to support the apparatus 1300 in communicating with another network element (for example, a second terminal apparatus). For example, the communication unit is configured to support the apparatus 1300 in performing S301 shown in FIG. 3, and/or another process used for the solution described in this specification.

Optionally, the multicast feedback configuration apparatus 1300 may further include a storage unit 1301, configured to store program code and data of the apparatus 1300. The data may include but is not limited to original data, intermediate data, or the like.

The processing unit 1302 may be a processor or a controller, for example, a CPU, a general purpose processor, a DSP, an ASIC, an FPGA or another programmable logic device, a transistor logic device, a hardware component, or any combination thereof. The processing unit 1302 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The communication unit 1303 may be a communication interface, a transceiver, a transceiver circuit, or the like. The communication interface is a general name. In a specific implementation, the communication interface may include a plurality of interfaces, for example, an interface between terminals and/or another interface.

The storage unit 1301 may be a memory.

Figure 14:
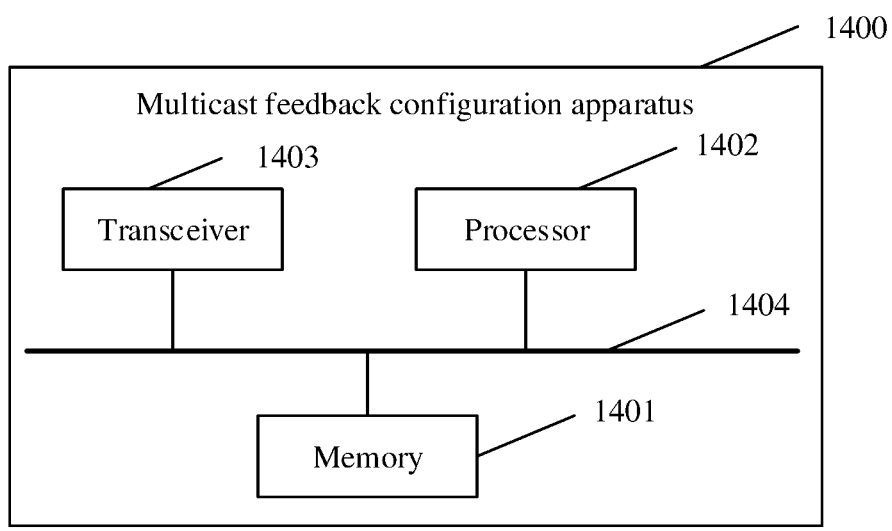
FIG. 14 is a schematic structural diagram of a multicast feedback configuration apparatus according to an embodiment of this application.

When the processing unit 1302 is a processor, the communication unit 1303 is a communication interface, and the storage unit 1301 is a memory, a multicast feedback configuration apparatus 1400 in this embodiment of this application may be shown in FIG. 14.

Referring to FIG. 14, the apparatus 1400 includes a processor 1402, a transceiver 1403, and a memory 1401.

The transceiver 1403 may be an independently disposed transmitter, and the transmitter may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in the embodiments of this application.

Optionally, the apparatus 1400 may further include a bus 1404. The transceiver 1403, the processor 1402, and the memory 1401 may be connected to each other through the bus 1404. The bus 1404 may be a peripheral component interconnect (PCI for short) bus, an extended industry standard architecture (EISA for short) bus, or the like. The bus 1404 may be classified into an address bus, a data bus, a control bus, and the like. For ease of representation, only one thick line is used to represent the bus in FIG. 14, but this does not mean that there is only one bus or only one type of bus.

A person of ordinary skill in the art may understand that all or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general purpose computer, a special purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiments are merely examples. For example, division into units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located at one position, or may be distributed on a plurality of network devices (for example, terminals). Some or all of the units may be selected based on an actual requirement to achieve an objective of the solutions of the embodiments.

In addition, function units in the embodiments of this application may be integrated into one processing unit, or each of the function units may exist independently, or two or more units may be integrated into one unit. The integrated unit may be implemented in a form of hardware, or may be implemented in a form of hardware and a software function unit.

Based on the foregoing descriptions of the implementations, a person skilled in the art may clearly understand that this application may be implemented by software and necessary universal hardware or by hardware only. In most circumstances, the former is a preferred implementation. Based on such an understanding, the technical solutions of this application essentially or the part contributing to the conventional technology may be implemented in a form of a software product. The computer software product is stored in a readable storage medium, for example, a floppy disk, a hard disk, or an optical disc of a computer, and includes several instructions for instructing a computer device (which may be a personal computer, a server, or a network device) to perform the methods described in the embodiments of this application.

What is claimed is:

1. A method, comprising:
    sending, by a first terminal, first information to a second terminal, the first information comprising information indicating a feedback manner of first data, wherein the first data is a data packet sent by the first terminal to the second terminal, and the feedback manner is a first feedback manner or a second feedback manner,
    wherein the first terminal is associated with a plurality of channels having a plurality of channel types, and the feedback manner corresponds to an overall channel busy degree for the plurality of channels having the plurality of channel types,
        the first feedback manner is that the second terminal feeds back acknowledgement information when the data packet fails to be received and not when there is a successful receipt of the data packet, the acknowledgement information indicating that the data packet failed to be received, and
        the second feedback manner is that the second terminal feeds back, to the first terminal, acknowledgement information indicating that the data packet is successfully received or fails to be received; and
    determining, by the first terminal, that the first information has been transmitted greater than a preset quantity of retransmissions, wherein sending, by the first terminal, the first information to the second terminal comprises:
    sending, by the first terminal, the first information to a forwarding device that forwards the first information to the second terminal.

2. The method according to claim 1, further comprising:
    obtaining, by the first terminal, second information, the second information comprising resource congestion control information, or a quantity of second terminals, or both the resource congestion control information and the quantity of second terminals, the feedback manner being determined based on the second information.

3. The method according to claim 2, wherein the second information comprises the quantity of second terminals, and the method comprises:
    in response to determining that the quantity of second terminals is greater than a preset quantity critical value, determining that the feedback manner is the first feedback manner, and
    the method further comprises:
        in response to determining that the quantity of second terminals changes to be less than the preset quantity critical value, determining that the feedback manner changes to be the second feedback manner.

4. The method according to claim 2, wherein the second information comprises the resource congestion control information and the quantity of second terminals, and the feedback manner is based on both the resource congestion control information and the quantity of the second terminals.

5. The method according to claim 2, wherein the second information comprises the resource congestion control information comprising a channel occupancy rate (CR), the method further comprising:
    determining, by the first terminal, the feedback manner based on whether the CR is greater than a preset CR critical value.

6. The method according to claim 1, wherein the first information is sidelink control information (SCI); and
    the SCI comprises a preset field, the preset field indicating the feedback manner to be used by the second terminal, and different values of the preset field indicate different feedback manners to be used by the second terminal; or
    the preset field comprises a first preset field and a second preset field, wherein
    the first preset field indicating a resource to be used by a physical sidelink feedback channel (PSFCH) for transmitting the acknowledgement information in the first feedback manner; and
    the second preset field indicating a resource to be used by the PSFCH for transmitting the acknowledgement information in the second feedback manner.

7. The method according to claim 1, wherein the first information is sidelink control information (SCI);
    formats of the SCI comprise a first format and a second format;
    the SCI in the first format indicating to the second terminal to use the first feedback manner; and
    the SCI in the second format indicating to the second terminal to use the second feedback manner.

8. The method according to claim 1, wherein before sending, by the first terminal, the first information to the second terminal, the method further comprises:
    receiving, by the first terminal, third information from an access network device, wherein the third information comprises the information indicating the feedback manner of the first data, and wherein the information indicating the feedback manner of the first data comprises a 1-bit indicator.

9. The method according to claim 8, wherein
    the third information is system information, and a master information block (MIB) of the system information comprises the information indicating the feedback manner to be used by the second terminal, or
    a system information block (SIB) of the system information comprises the information indicating the feedback manner to be used by the second terminal; or the third information is radio resource control (RRC) signaling, and the RRC signaling comprises the information indicating the feedback manner to be used by the second terminal; or the third information is medium access control (MAC) signaling, and the MAC signaling comprises the information indicating the feedback manner to be used by the second terminal; or the third information is downlink control information (DCI), and the DCI comprises the information indicating the feedback manner to be used by the second terminal.

10. The method according to claim 1, wherein the plurality of channels having the plurality of channel types comprises a physical sidelink feedback channel (PSFCH), a physical sidelink shared channel (PSSCH), and a physical sidelink control channel (PSCCH).

11. An apparatus, comprising:
a non-transitory memory storage comprising instructions; and
one or more processors in communication with the memory storage, wherein execution of the instructions by the one or more processors causes the apparatus to:
send first information to a second terminal, the first information comprising information indicating a feedback manner of first data, wherein the first data is a data packet sent to the second terminal, and the feedback manner is a first feedback manner or a second feedback manner,
wherein the apparatus is associated with a plurality of channels having channel types, and the feedback manner corresponds to an overall channel busy degree for the plurality of channels having the plurality of channel types,
the first feedback manner is that the second terminal feeds back acknowledgement information when the data packet fails to be received and not when there is a successful receipt of the data packet, the acknowledgement information indicating that the data packet failed to be received, and
the second feedback manner is that the second terminal feeds back acknowledgement information indicating that the data packet is successfully received or fails to be received; and
determine that the first information has been transmitted greater than a preset quantity of retransmissions, wherein to send the first information to the second terminal the apparatus is caused to:
send the first information to a forwarding device that forwards the first information to the second terminal.

12. The apparatus according to claim 11, wherein the execution of the instructions by the one or more processors further causes the apparatus to:
obtain second information comprising resource congestion control information, or a quantity of second terminals, or both the resource congestion control information and the quantity of second terminals, the feedback manner being determined based on the second information.

13. The apparatus according to claim 12, wherein the second information comprises the quantity of second terminals, and wherein the execution of the instructions by the one or more processors causes the apparatus to:
in response to determining that the quantity of second terminals is greater than a preset quantity critical value, determining that the feedback manner is the first feedback manner, and the execution of the instructions by the one or more processors further causes the apparatus to:
in response to determining that the quantity of second terminals changes to be less than the preset quantity critical value, determine that the feedback manner changes to be the second feedback manner.

14. The apparatus according to claim 11, wherein the first information is sidelink control information (SCI); and
the SCI comprises a preset field, the preset field indicating the feedback manner to be used by the second terminal, and different values of the preset field indicate different feedback manners to be used by the second terminal; or
the preset field comprises a first preset field and a second preset field, wherein
the first preset field indicating a resource to be used by a physical sidelink feedback channel (PSFCH) for transmitting the acknowledgement information in the first feedback manner; and
the second preset field indicating a resource to be used by the PSFCH for transmitting the acknowledgement information in the second feedback manner.

15. The apparatus according to claim 11, wherein the execution of the instructions by the one or more processors further causes the apparatus to:
before the first information is sent to the second terminal, receive third information from an access network device, wherein the third information comprises the information indicating the feedback manner of the first data, and wherein the information indicating the feedback manner of the first data comprises a 1-bit indicator.

16. The apparatus according to claim 15, wherein
the third information is system information, and a master information block (MIB) of the system information comprises the information indicating the feedback manner to be used by the second terminal, or
a system information block (SIB) of the system information comprises the information indicating the feedback manner to be used by the second terminal; or
the third information is radio resource control (RRC) signaling, and the RRC signaling comprises the information indicating the feedback manner to be used by the second terminal; or
the third information is medium access control (MAC) signaling, and the MAC signaling comprises the information indicating the feedback manner to be used by the second terminal; or
the third information is downlink control information (DCI), and the DCI comprises the information indicating the feedback manner to be used by the second terminal.

17. A non-transitory computer-readable storage medium comprising instructions which, when executed by at least one processor of an apparatus, cause the apparatus to:
send first information to a second terminal, wherein the first information comprises information indicating a feedback manner of first data, wherein the first data is a data packet sent by the apparatus to the second terminal, and the feedback manner is a first feedback manner or a second feedback manner,
wherein the apparatus is associated with a plurality of channels having channel types, and the feedback manner corresponds to an overall channel busy degree for the plurality of channels having the channel types,
the first feedback manner is that the second terminal feeds back acknowledgement information when the data packet fails to be received and not when there is a successful receipt of the data packet, the acknowledgement information indicating that the data packet failed to be received, and the second feedback manner is that the second terminal feeds back, to the apparatus, acknowledgement information indicating that the data packet is successfully received or fails to be received;

determine that the first information has been transmitted greater than a preset quantity of retransmissions, wherein to send the first information to the second terminal, the instructions further cause the apparatus to:

send the first information to a forwarding device that forwards the first information to the second terminal.

18. The non-transitory computer-readable storage medium according to claim 17, wherein the instructions further cause the apparatus to:

obtain second information, wherein the second information comprises resource congestion control information, or a quantity of second terminals, or both the resource congestion control information and the quantity of second terminals, the feedback manner being determined based on the second information.

19. The non-transitory computer-readable storage medium according to claim 17, wherein the first information is sidelink control information (SCI); and the SCI comprises a preset field, the preset field indicating the feedback manner to be used by the second terminal, and different values of the preset field indicate different feedback manners to be used by the second terminal; or the preset field comprises a first preset field and a second preset field, wherein the first preset field indicating a resource to be used by a physical sidelink feedback channel (PSFCH) for transmitting the acknowledgement information in the first feedback manner; and the second preset field indicating a resource to be used by the PSFCH for transmitting the acknowledgement information in the second feedback manner.

20. The non-transitory computer-readable storage medium according to claim 15, wherein the first information is sidelink control information (SCI);

formats of the SCI comprise a first format and a second format;

the SCI in the first format indicating to the second terminal to use the first feedback manner; and the SCI in the second format indicating to the second terminal to use the second feedback manner.

* * * * *